US012416800B2

(12) United States Patent
Trivedi et al.

(10) Patent No.: US 12,416,800 B2
(45) Date of Patent: Sep. 16, 2025

(54) INSERTION TOOL

(71) Applicants: General Electric Company, Schenectady, NY (US); Oliver Crispin Robotics Limited, Altrincham (GB)

(72) Inventors: Deepak Trivedi, Niskayuna, NY (US); Grover Andrew Bennett, Esperance, NY (US); Stephen Paul Leclerc, Niskayuna, NY (US); Andrew Crispin Graham, Badminton (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 17/144,487

(22) Filed: Jan. 8, 2021

(65) Prior Publication Data
US 2022/0221707 A1    Jul. 14, 2022

(51) Int. Cl.
*G02B 23/24*    (2006.01)
*B25J 9/06*    (2006.01)
(Continued)

(52) U.S. Cl.
CPC ......... *G02B 23/2476* (2013.01); *B25J 18/06* (2013.01); *B25J 9/065* (2013.01); *B25J 9/104* (2013.01); *B33Y 80/00* (2014.12); *Y10S 901/21* (2013.01)

(58) Field of Classification Search
CPC ........ G02B 23/2476; B33Y 80/00; B25J 9/06; B25J 9/1085; B25J 18/06; F05D 2260/36; F05D 2230/80; F01D 25/00; B23P 6/002
See application file for complete search history.

(56) References Cited

U.S. PATENT DOCUMENTS

| 338,310 A | 3/1886 | Smith |
| 1,774,986 A | 9/1930 | MacKenzie |

(Continued)

FOREIGN PATENT DOCUMENTS

| CA | 2960352 | 9/2017 |
| CA | 2960352 A1 | 9/2017 |

(Continued)

OTHER PUBLICATIONS

Huang et al., In-Situ Continuous Coke Deposit Removal by Catalytic Steam Gasification For Fuel-Cooled Thermal Management, Journal of Engineering for Gas Turbines and Power, vol. 134, Oct. 2012, 8 Pages.

(Continued)

*Primary Examiner* — Michael W Hotchkiss
(74) *Attorney, Agent, or Firm* — Fitch, Even, Tabin & Flannery LLP

(57) ABSTRACT

An insertion tool for performing an operation on equipment, the insertion tool including: a plurality of segments, each segment of the plurality of segments including a body comprising: a first hinge; and a second hinge, the first hinge of a first segment being coupled to the second hinge of a second segment adjacent to the first segment through an interface, wherein the interface comprises a powder gap, a multi-modal interface, a compliance feature, a displace-to-lock configuration, an interference fit, or any combination thereof, wherein the insertion tool is configured to be selectively rigidizable using a strength member interfacing with the plurality of segments.

16 Claims, 11 Drawing Sheets

(51) Int. Cl.
  *B25J 9/10*    (2006.01)
  *B25J 18/06*   (2006.01)
  *B33Y 80/00*   (2015.01)

(56) References Cited

U.S. PATENT DOCUMENTS

| | | |
|---|---|---|
| 1,987,972 A | 1/1935 | Rhein et al. |
| 2,073,903 A | 3/1937 | Maurice |
| 2,510,198 A | 6/1950 | Tesmer |
| 2,974,676 A | 3/1961 | Hagelthorn |
| 3,096,962 A | 7/1963 | Pieter |
| 3,190,286 A | 6/1965 | Stokes |
| 3,266,059 A | 8/1966 | Stelle |
| 3,270,641 A | 9/1966 | Gosselin |
| 3,583,393 A | 6/1971 | Takahashi |
| 3,625,084 A | 12/1971 | Low |
| 3,778,170 A | 12/1973 | Howell |
| 4,035,137 A | 7/1977 | Arand |
| 4,041,695 A | 8/1977 | Harper |
| 4,095,418 A | 6/1978 | Mansson et al. |
| 4,170,489 A | 10/1979 | Magnus et al. |
| 4,215,979 A | 8/1980 | Morishita |
| 4,227,584 A | 10/1980 | Driver |
| 4,242,863 A | 1/1981 | Bailey |
| 4,483,326 A | 11/1984 | Yamaka |
| 4,625,936 A | 12/1986 | Hadden, Sr. |
| 4,651,718 A | 3/1987 | Collins |
| 4,655,673 A | 4/1987 | Hawkes |
| 4,696,544 A | 9/1987 | Costella |
| 4,703,888 A | 11/1987 | Kawamura et al. |
| 4,713,120 A | 12/1987 | Hodgens, II et al. |
| 4,714,339 A | 12/1987 | Lau |
| 4,730,960 A | 3/1988 | Lewis |
| 4,735,501 A | 4/1988 | Ginsburgh |
| 4,757,258 A | 7/1988 | Kelly, Jr. |
| 4,773,395 A | 9/1988 | Suzuki |
| 4,790,294 A | 12/1988 | Allred, III et al. |
| 4,790,624 A | 12/1988 | Van Hoye |
| 4,826,087 A | 5/1989 | Chinery |
| 4,846,573 A | 7/1989 | Taylor |
| 4,890,602 A | 1/1990 | Hake |
| 4,911,206 A | 3/1990 | Gropp et al. |
| 4,972,048 A | 11/1990 | Martin |
| 4,991,565 A | 2/1991 | Takahashi |
| 5,090,205 A | 2/1992 | Foster |
| 5,102,221 A | 4/1992 | Desgranges |
| 5,164,826 A | 11/1992 | Dailey |
| 5,203,646 A | 4/1993 | Landsberger |
| 5,254,809 A | 10/1993 | Martin |
| 5,271,382 A | 12/1993 | Chikama |
| 5,323,962 A | 6/1994 | Jassby |
| 5,337,733 A | 8/1994 | Bauerfeind et al. |
| 5,339,845 A | 8/1994 | Huddas |
| 5,372,162 A | 12/1994 | Frey |
| 5,385,102 A | 1/1995 | Villedieu |
| 5,390,402 A | 2/1995 | White |
| 5,399,164 A | 3/1995 | Snoke |
| 5,408,970 A | 4/1995 | Burkhard |
| 5,482,029 A | 1/1996 | Sekiguchi et al. |
| 5,501,156 A | 3/1996 | Richter |
| 5,558,665 A | 9/1996 | Kieturakis |
| 5,644,394 A | 7/1997 | Owens |
| 5,667,023 A | 9/1997 | Harrell |
| 5,755,731 A * | 5/1998 | Grinberg .......... A61B 17/32002 606/180 |
| 5,787,897 A | 8/1998 | Kieturakis |
| 5,807,241 A | 9/1998 | Heimberger |
| 5,816,769 A | 10/1998 | Bauer et al. |
| 5,842,381 A | 12/1998 | Feiten |
| 6,123,273 A | 9/2000 | Loprinzo |
| 6,156,974 A | 12/2000 | Blase |
| 6,213,974 B1 | 4/2001 | Smith |
| 6,216,439 B1 | 4/2001 | Nakamoto |
| 6,287,206 B1 | 9/2001 | Stage |
| 6,311,704 B1 | 11/2001 | Foster |
| 6,371,148 B1 | 4/2002 | Tripp |
| 6,431,824 B1 | 8/2002 | Schotsch |
| 6,432,046 B1 | 8/2002 | Yarush |
| 6,478,033 B1 | 11/2002 | Foster |
| 6,481,195 B1 | 11/2002 | Blase |
| 6,542,230 B1 | 4/2003 | Luke |
| 6,643,877 B1 | 11/2003 | Amtenbrink |
| 6,698,456 B2 | 3/2004 | Neubauer |
| 6,783,491 B2 | 8/2004 | Saadat et al. |
| 6,800,016 B2 | 10/2004 | Wittenberg |
| 6,837,846 B2 | 1/2005 | Jaffe et al. |
| 6,941,974 B2 | 9/2005 | Utaki |
| 6,943,570 B2 | 9/2005 | Duffy |
| 6,955,023 B2 | 10/2005 | Rotheroe |
| 6,957,781 B2 | 10/2005 | Gowens et al. |
| 6,974,411 B2 | 12/2005 | Belson |
| 7,033,979 B2 | 4/2006 | Herwig |
| 7,150,416 B2 | 12/2006 | Martin et al. |
| 7,171,279 B2 | 1/2007 | Buckingham |
| 7,182,024 B2 | 2/2007 | Pfeiffer |
| 7,182,025 B2 | 2/2007 | Ghorbel |
| 7,185,407 B2 | 3/2007 | Boyl-Davis |
| 7,258,521 B2 | 8/2007 | Guerra |
| 7,509,735 B2 | 3/2009 | Philip |
| 7,543,518 B2 | 6/2009 | Buckingham |
| 7,559,340 B2 | 7/2009 | Ikeda et al. |
| 7,571,735 B2 | 8/2009 | Wagner |
| 7,654,143 B2 | 2/2010 | Roney |
| 7,662,091 B2 | 2/2010 | Bagley |
| 7,677,181 B2 | 3/2010 | Boyl-Davis |
| 7,703,272 B2 | 4/2010 | Wagner et al. |
| 7,707,704 B2 | 5/2010 | Crocker |
| 7,712,301 B1 | 5/2010 | Wagner |
| 7,718,894 B2 | 5/2010 | Blase |
| 7,741,563 B2 | 6/2010 | Harada et al. |
| 7,849,878 B2 | 12/2010 | Kohler et al. |
| 7,854,109 B2 | 12/2010 | Zubiate et al. |
| 7,883,674 B2 | 2/2011 | Huang |
| 8,028,936 B2 | 10/2011 | McDermott |
| 8,069,747 B2 | 12/2011 | Buckingham |
| 8,096,030 B2 | 1/2012 | Graichen |
| 8,100,031 B2 | 1/2012 | Zubiate |
| 8,125,755 B2 | 2/2012 | Garcia et al. |
| 8,152,934 B2 | 4/2012 | Lee et al. |
| 8,190,294 B2 | 5/2012 | Niclas |
| 8,205,522 B2 | 6/2012 | Buckingham |
| 8,206,488 B2 | 6/2012 | Mantkowski |
| 8,277,647 B2 | 10/2012 | Rice |
| 8,299,785 B2 | 10/2012 | Bousquet |
| 8,303,243 B2 | 11/2012 | Fish et al. |
| 8,327,518 B2 | 12/2012 | Korner |
| 8,374,722 B2 | 2/2013 | Buckingham |
| 8,377,232 B2 | 2/2013 | Myers et al. |
| 8,395,300 B2 | 3/2013 | Aabloo |
| 8,400,501 B2 | 3/2013 | Heyworth |
| 8,409,248 B2 | 4/2013 | Ginn |
| 8,453,533 B2 | 6/2013 | Ryland et al. |
| 8,505,204 B2 | 8/2013 | Reverchon |
| 8,571,711 B2 | 10/2013 | Jacobsen et al. |
| 8,635,849 B2 | 1/2014 | Tassone et al. |
| 8,640,531 B2 | 2/2014 | Remillard |
| 8,674,222 B2 | 3/2014 | Hsieh |
| 8,714,038 B2 | 5/2014 | Moran |
| 8,758,232 B2 | 6/2014 | Graham et al. |
| 8,786,848 B2 | 7/2014 | Hatcher |
| 8,833,826 B2 | 9/2014 | Garcia |
| 8,893,749 B2 * | 11/2014 | Perry .................. A61B 1/0055 138/155 |
| 8,920,579 B2 | 12/2014 | Liedtke |
| 8,945,096 B2 | 2/2015 | Zubiate et al. |
| 8,959,902 B2 | 2/2015 | Olivier et al. |
| 8,991,163 B2 | 3/2015 | Olivier |
| 8,992,421 B2 | 3/2015 | Stand et al. |
| 8,998,567 B2 | 4/2015 | Scipio et al. |
| 9,016,159 B2 | 4/2015 | Kell |
| 9,016,293 B2 | 4/2015 | Battaglioli et al. |
| 9,028,618 B2 | 5/2015 | Battaglioli et al. |
| 9,127,234 B2 | 9/2015 | Hughes et al. |
| 9,138,782 B2 | 9/2015 | Dorshimer |

(56) References Cited

U.S. PATENT DOCUMENTS

| | | |
|---|---|---|
| 9,149,929 B2 | 10/2015 | Motzer et al. |
| 9,187,700 B2 | 11/2015 | Huang et al. |
| 9,220,398 B2 * | 12/2015 | Woodley ............... B25J 18/06 |
| 9,263,866 B2 | 2/2016 | Shimizu |
| 9,272,425 B2 | 3/2016 | Garcia |
| 9,294,737 B2 | 3/2016 | Hatcher, Jr. |
| 9,300,926 B2 | 3/2016 | Kell |
| 9,329,377 B2 | 5/2016 | Kell |
| 9,389,150 B2 | 7/2016 | Kimpel, Jr. |
| 9,399,299 B2 | 7/2016 | Hermey |
| 9,403,244 B2 | 8/2016 | Rautenberg |
| 9,409,292 B2 | 8/2016 | Smith |
| 9,435,750 B2 | 9/2016 | Matsumoto |
| 9,458,735 B1 | 10/2016 | Diwinsky |
| 9,492,906 B2 | 11/2016 | Rosing et al. |
| 9,505,125 B2 | 11/2016 | Zubiate et al. |
| 9,549,663 B2 | 1/2017 | Larkin |
| 9,581,440 B2 | 2/2017 | Ruhge |
| 9,726,628 B2 | 8/2017 | Ruhge |
| 9,733,195 B2 | 8/2017 | Colletti |
| 9,739,168 B2 | 8/2017 | Ekanayake |
| 9,778,141 B2 | 10/2017 | Bancalari |
| 9,788,141 B2 | 10/2017 | Ponec |
| 9,857,002 B2 | 1/2018 | Ott et al. |
| 9,902,024 B2 | 2/2018 | Ernst |
| 9,909,694 B2 | 3/2018 | Graham et al. |
| 9,926,517 B2 | 3/2018 | Tibbetts |
| 9,932,854 B1 | 4/2018 | Tibbetts |
| 9,951,647 B2 | 4/2018 | Rawson |
| 9,957,066 B2 | 5/2018 | Bewlay |
| 10,005,111 B2 | 6/2018 | Eriksen |
| 10,018,113 B2 | 7/2018 | Bewlay |
| 10,060,569 B2 | 8/2018 | Sivacoe |
| 10,085,624 B2 | 10/2018 | Isoda |
| 10,197,473 B2 | 2/2019 | Diwinsky |
| 10,213,919 B2 | 2/2019 | Axinte et al. |
| 10,227,891 B2 | 3/2019 | Eriksen |
| 10,238,457 B2 | 3/2019 | Herrell |
| 10,265,810 B2 | 4/2019 | Diwinsky |
| 10,323,539 B2 | 6/2019 | Bewlay |
| 10,377,968 B2 | 8/2019 | Brooks |
| 10,385,723 B2 | 8/2019 | Flynn |
| 10,428,993 B2 | 10/2019 | Whitefield |
| 10,470,831 B2 | 11/2019 | Cohen |
| 10,488,349 B2 | 11/2019 | Sibbach |
| 10,618,162 B2 * | 4/2020 | Norton ............... B25J 18/06 |
| 10,634,004 B2 | 4/2020 | Giljohann |
| 10,639,805 B2 * | 5/2020 | Saraliev ............... A61B 34/37 |
| 10,669,885 B2 | 6/2020 | Pecchiol |
| 10,775,315 B2 | 9/2020 | Mekala |
| 10,884,232 B1 | 1/2021 | Trivedi |
| 10,920,181 B2 | 2/2021 | Martin |
| 10,926,403 B1 | 2/2021 | Asokan |
| 10,962,345 B2 | 3/2021 | Graham |
| 10,967,504 B2 | 4/2021 | Simaan |
| 11,027,317 B2 | 6/2021 | Tibbetts |
| 11,371,437 B2 | 6/2022 | Hawke |
| 11,413,763 B2 * | 8/2022 | Lee ............... B25J 13/086 |
| 11,419,692 B2 * | 8/2022 | Kim ............... A61B 34/71 |
| 11,441,446 B2 | 9/2022 | Rawson |
| 11,518,048 B2 * | 12/2022 | Saraliev ............... B25J 17/0241 |
| 11,613,003 B2 | 3/2023 | Graham |
| 11,692,650 B2 | 7/2023 | Graham |
| 11,707,819 B2 | 7/2023 | Graham |
| 11,752,622 B2 | 9/2023 | Graham |
| 11,787,069 B2 | 10/2023 | Curle |
| 11,793,536 B2 * | 10/2023 | Walen ............... A61B 17/29 |
| 12,091,981 B2 | 9/2024 | Foxall |
| 12,194,620 B2 | 1/2025 | Graham |
| 2002/0091027 A1 | 7/2002 | Scheufele |
| 2003/0089267 A1 | 5/2003 | Ghorbel |
| 2003/0171736 A1 | 9/2003 | Bon |
| 2003/0229420 A1 | 12/2003 | Buckingham |
| 2004/0059191 A1 | 3/2004 | Krupa |
| 2004/0138525 A1 | 7/2004 | Saadat |
| 2004/0186350 A1 | 9/2004 | Brenneman et al. |
| 2004/0193016 A1 | 9/2004 | Root |
| 2004/0249367 A1 | 12/2004 | Saadat et al. |
| 2004/0255422 A1 | 12/2004 | Reback |
| 2005/0075538 A1 | 4/2005 | Banik |
| 2005/0107667 A1 | 5/2005 | Danitz |
| 2005/0124856 A1 | 6/2005 | Fujikura |
| 2005/0148287 A1 | 7/2005 | Moeller |
| 2005/0203340 A1 | 9/2005 | Butler et al. |
| 2005/0204489 A1 | 9/2005 | Velez |
| 2005/0273085 A1 | 12/2005 | Hinman |
| 2006/0073348 A1 | 4/2006 | Farmer et al. |
| 2006/0074283 A1 | 4/2006 | Henderson |
| 2006/0074383 A1 | 4/2006 | Boulais |
| 2006/0131908 A1 | 6/2006 | Tadano |
| 2006/0156851 A1 | 7/2006 | Jacobsen |
| 2006/0170386 A1 | 8/2006 | Anhalt |
| 2006/0258265 A1 | 11/2006 | Moeller |
| 2008/0066821 A1 | 3/2008 | Komiya et al. |
| 2008/0149141 A1 | 6/2008 | Sales |
| 2008/0161971 A1 | 7/2008 | Buckingham |
| 2008/0199304 A1 | 8/2008 | Moran |
| 2008/0218728 A1 | 9/2008 | Kirschner |
| 2008/0250769 A1 | 10/2008 | Wagner et al. |
| 2009/0084108 A1 | 4/2009 | Prociw et al. |
| 2009/0084408 A1 | 4/2009 | Thiemann |
| 2009/0084411 A1 | 4/2009 | Woodcock et al. |
| 2009/0086014 A1 | 4/2009 | Lea |
| 2009/0132085 A1 | 5/2009 | Sjostrand |
| 2009/0216245 A1 | 8/2009 | Viola |
| 2009/0216374 A1 | 8/2009 | Low |
| 2009/0255102 A1 | 10/2009 | McMasters et al. |
| 2009/0255116 A1 | 10/2009 | McMasters et al. |
| 2009/0256007 A1 | 10/2009 | McMasters et al. |
| 2009/0320891 A1 | 12/2009 | Liedtke |
| 2010/0030377 A1 | 2/2010 | Unsworth |
| 2010/0037924 A1 | 2/2010 | Gebhardt et al. |
| 2010/0108107 A1 | 5/2010 | Mantkowski |
| 2010/0108377 A1 | 5/2010 | Terada |
| 2010/0116292 A1 | 5/2010 | Wagner |
| 2010/0147330 A1 | 6/2010 | Kohler et al. |
| 2010/0160736 A1 | 6/2010 | Padget |
| 2010/0234988 A1 | 9/2010 | Buckingham |
| 2010/0256447 A1 | 10/2010 | Dubi |
| 2010/0275404 A1 | 11/2010 | Myers |
| 2011/0030381 A1 | 2/2011 | Sordyl |
| 2011/0112527 A1 | 5/2011 | Hamilton, Jr. |
| 2011/0152879 A1 * | 6/2011 | Williams ............... A61B 34/30 606/130 |
| 2011/0174108 A1 | 7/2011 | Graham |
| 2011/0295427 A1 | 12/2011 | Motzer |
| 2011/0303053 A1 | 12/2011 | Schneider |
| 2011/0313243 A1 | 12/2011 | Zubiate |
| 2012/0067158 A1 | 3/2012 | Kell |
| 2012/0125164 A1 | 5/2012 | Kozak |
| 2012/0167547 A1 | 7/2012 | Zhang et al. |
| 2012/0184817 A1 | 7/2012 | Sugiyama |
| 2012/0197241 A1 | 8/2012 | Golden |
| 2012/0260497 A1 | 10/2012 | White |
| 2012/0279323 A1 | 11/2012 | Broda |
| 2012/0312103 A1 | 12/2012 | Hannott |
| 2013/0074879 A1 | 3/2013 | Battaglioli et al. |
| 2013/0125753 A1 | 5/2013 | Ono et al. |
| 2013/0192353 A1 | 8/2013 | Hatcher |
| 2013/0199040 A1 | 8/2013 | Dudeck |
| 2013/0226033 A1 | 8/2013 | Eskuri |
| 2013/0255410 A1 | 10/2013 | Lee |
| 2013/0335530 A1 | 12/2013 | Hatcher, Jr. |
| 2013/0340559 A1 | 12/2013 | Danitz et al. |
| 2014/0005683 A1 | 1/2014 | Stand |
| 2014/0012288 A1 | 1/2014 | Darisse |
| 2014/0055596 A1 | 2/2014 | Hatcher, Jr. |
| 2014/0058364 A1 * | 2/2014 | Donhowe ............... A61B 34/30 606/1 |
| 2014/0069460 A1 | 3/2014 | Kell |
| 2014/0125791 A1 | 5/2014 | Arellano |
| 2014/0133269 A1 | 5/2014 | Hansen |
| 2014/0260755 A1 | 9/2014 | Dong |
| 2014/0371764 A1 | 12/2014 | Oyola |

(56) References Cited

U.S. PATENT DOCUMENTS

| | | |
|---|---|---|
| 2015/0032252 A1 | 1/2015 | Galluzzo |
| 2015/0036150 A1 | 2/2015 | Kobayashi |
| 2015/0064008 A1 | 3/2015 | Lewis |
| 2015/0159122 A1 | 6/2015 | Tibbetts |
| 2015/0159557 A1 | 6/2015 | Scipio et al. |
| 2015/0202013 A1* | 7/2015 | Teichtmann ...... A61B 17/00234 606/130 |
| 2015/0233263 A1 | 8/2015 | Battaglioli et al. |
| 2015/0246449 A1 | 9/2015 | Sakai |
| 2015/0300920 A1 | 10/2015 | Deascanis |
| 2015/0338353 A1 | 11/2015 | Bancalari |
| 2015/0341600 A1 | 11/2015 | Hatcher, Jr. |
| 2015/0360629 A1 | 12/2015 | Sekino |
| 2016/0000629 A1 | 1/2016 | Jackson |
| 2016/0008990 A1* | 1/2016 | Franz ................ B25J 18/00 74/490.05 |
| 2016/0031078 A1 | 2/2016 | Kapoor |
| 2016/0032761 A1 | 2/2016 | Griffiths et al. |
| 2016/0040803 A1 | 2/2016 | Steeger |
| 2016/0052129 A1* | 2/2016 | Ekas .................. B25J 9/104 901/21 |
| 2016/0114488 A1 | 4/2016 | Mascorro Medina |
| 2016/0146036 A1 | 5/2016 | Richter |
| 2016/0174816 A1 | 6/2016 | Choset |
| 2016/0175057 A1 | 6/2016 | Ibach |
| 2016/0182776 A1 | 6/2016 | Huang |
| 2016/0186602 A1 | 6/2016 | Saenz |
| 2016/0262840 A1* | 9/2016 | Zubiate ............... B25J 18/06 |
| 2016/0339584 A1 | 11/2016 | Esteban Finck |
| 2017/0023154 A1 | 1/2017 | Jaeker |
| 2017/0095922 A1 | 4/2017 | Licht et al. |
| 2017/0100197 A1 | 4/2017 | Zubiate |
| 2017/0120457 A1* | 5/2017 | Saraliev ............. A61B 90/361 |
| 2017/0129110 A1 | 5/2017 | Ohm |
| 2017/0157719 A1 | 6/2017 | Diwinsky |
| 2017/0165721 A1 | 6/2017 | Tibbetts |
| 2017/0167289 A1 | 6/2017 | Diwinsky |
| 2017/0167290 A1 | 6/2017 | Kulkarni |
| 2017/0167953 A1 | 6/2017 | Diwinsky |
| 2017/0175569 A1 | 6/2017 | Rawson |
| 2017/0176342 A1 | 6/2017 | Colletti |
| 2017/0191376 A1 | 7/2017 | Eriksen et al. |
| 2017/0204739 A1 | 7/2017 | Rawson |
| 2017/0219814 A1 | 8/2017 | Letter |
| 2017/0219815 A1 | 8/2017 | Letter |
| 2017/0239762 A1 | 8/2017 | Roberts |
| 2017/0254217 A1 | 9/2017 | Eriksen |
| 2017/0274484 A1 | 9/2017 | Roberts |
| 2017/0319048 A1 | 11/2017 | Ikeda |
| 2017/0328497 A1 | 11/2017 | Dantin |
| 2017/0359530 A1 | 12/2017 | Boudin |
| 2017/0361470 A1 | 12/2017 | Otero Del Real |
| 2018/0058233 A1 | 3/2018 | Norton |
| 2018/0071039 A1 | 3/2018 | Barnett |
| 2018/0094538 A1 | 4/2018 | Tibbetts et al. |
| 2018/0119568 A1 | 5/2018 | Negoescu |
| 2018/0149038 A1 | 5/2018 | Eriksen |
| 2018/0155060 A1 | 6/2018 | Dauenhauer |
| 2018/0156062 A1 | 6/2018 | Dede |
| 2018/0156132 A1 | 6/2018 | Dede |
| 2018/0214220 A1* | 8/2018 | Kan .................. A61B 1/04 |
| 2018/0216036 A1 | 8/2018 | Tibbetts |
| 2018/0231162 A1 | 8/2018 | Zeng |
| 2018/0237163 A1 | 8/2018 | Bewlay |
| 2018/0242958 A1* | 8/2018 | Dayton ............. A61B 17/3478 |
| 2018/0245477 A1 | 8/2018 | Kulkarni |
| 2018/0258787 A1 | 9/2018 | Tibbetts |
| 2018/0291803 A1 | 10/2018 | Belay |
| 2018/0298781 A1 | 10/2018 | Tibbetts |
| 2018/0313225 A1 | 11/2018 | Millhaem et al. |
| 2018/0318024 A1 | 11/2018 | Yoshii |
| 2018/0355751 A1 | 12/2018 | Tibbetts |
| 2018/0361960 A1 | 12/2018 | Yamamoto |
| 2019/0022877 A1 | 1/2019 | Akin |
| 2019/0046010 A1 | 2/2019 | Tojo |
| 2019/0054638 A1 | 2/2019 | Norton |
| 2019/0145498 A1 | 5/2019 | Yoon |
| 2019/0153890 A1 | 5/2019 | Eriksen |
| 2019/0190190 A1 | 6/2019 | Bourgeas |
| 2019/0246878 A1 | 8/2019 | Bodner |
| 2019/0277770 A1 | 9/2019 | Mekala |
| 2019/0292938 A1 | 9/2019 | Wang |
| 2019/0308319 A1 | 10/2019 | Walters |
| 2019/0323378 A1 | 10/2019 | Tibbetts |
| 2019/0358813 A1 | 11/2019 | Graham |
| 2019/0358833 A1 | 11/2019 | Graham |
| 2019/0360794 A1 | 11/2019 | Graham |
| 2019/0366536 A1 | 12/2019 | Graham et al. |
| 2019/0383158 A1 | 12/2019 | Diwinsky |
| 2019/0383161 A1 | 12/2019 | Graham |
| 2020/0113412 A1 | 4/2020 | Jensen |
| 2020/0114497 A1 | 4/2020 | Graham |
| 2020/0114505 A1* | 4/2020 | Kikuchi ............... B25J 19/0029 |
| 2020/0114528 A1 | 4/2020 | Graham |
| 2020/0182345 A1 | 6/2020 | Gu |
| 2020/0205908 A1 | 7/2020 | Julian |
| 2020/0224552 A1 | 7/2020 | Millhaem |
| 2020/0316789 A1 | 10/2020 | Sohmshetty |
| 2020/0319119 A1 | 10/2020 | Peters |
| 2020/0323599 A1* | 10/2020 | Kim ..................... A61B 34/71 |
| 2020/0359879 A1 | 11/2020 | Cahill |
| 2020/0405142 A1 | 12/2020 | Whitaker |
| 2021/0078165 A1 | 3/2021 | Tang |
| 2021/0102870 A1 | 4/2021 | Trivedi |
| 2021/0108537 A1 | 4/2021 | Rigg |
| 2021/0137354 A1 | 5/2021 | Bob |
| 2021/0223142 A1 | 7/2021 | Sasaki |
| 2021/0229269 A1 | 7/2021 | Graham |
| 2021/0229270 A1 | 7/2021 | Graham |
| 2021/0231239 A1 | 7/2021 | Graham |
| 2021/0285374 A1 | 9/2021 | Hawke |
| 2021/0317752 A1 | 10/2021 | Deja |
| 2021/0388737 A1 | 12/2021 | Foxall |
| 2022/0221706 A1 | 7/2022 | Trivedi |
| 2022/0290608 A1 | 9/2022 | Hawke |
| 2022/0314430 A1 | 10/2022 | Graham |
| 2023/0194234 A1 | 6/2023 | Graham |
| 2024/0011413 A1 | 1/2024 | Millheam |
| 2024/0280033 A1 | 8/2024 | Foxall |
| 2024/0326266 A1 | 10/2024 | Graham |
| 2025/0163824 A1 | 5/2025 | Diwinsky |
| 2025/0180345 A1 | 6/2025 | Graham |

FOREIGN PATENT DOCUMENTS

| | | |
|---|---|---|
| CA | 3077622 A1 | 4/2019 |
| CA | 3043720 A1 | 11/2019 |
| CN | 86101283 A | 8/1986 |
| CN | 1162516 | 10/1997 |
| CN | 1050781 C | 3/2000 |
| CN | 1656312 | 8/2005 |
| CN | 1678937 | 10/2005 |
| CN | 1903517 | 1/2007 |
| CN | 101048101 | 10/2007 |
| CN | 101048102 | 10/2007 |
| CN | 101528111 A | 9/2009 |
| CN | 101881218 | 11/2010 |
| CN | 201769177 | 3/2011 |
| CN | 201800016 | 4/2011 |
| CN | 102257292 | 11/2011 |
| CN | 102292013 A | 12/2011 |
| CN | 102687057 | 9/2012 |
| CN | 102711585 | 10/2012 |
| CN | 102729240 A | 10/2012 |
| CN | 102871636 | 1/2013 |
| CN | 203370761 U | 1/2014 |
| CN | 103895012 A | 7/2014 |
| CN | 104175325 | 12/2014 |
| CN | 104582909 A | 4/2015 |
| CN | 103639156 B | 7/2015 |
| CN | 104870141 | 8/2015 |
| CN | 105144514 | 12/2015 |
| CN | 105377116 | 3/2016 |
| CN | 105431106 | 3/2016 |

(56) References Cited

FOREIGN PATENT DOCUMENTS

| | | |
|---|---|---|
| CN | 105436127 A | 3/2016 |
| CN | 105927820 | 9/2016 |
| CN | 106113019 | 11/2016 |
| CN | 106163431 | 11/2016 |
| CN | 106166746 | 11/2016 |
| CN | 106427289 A | 2/2017 |
| CN | 106659438 | 5/2017 |
| CN | 106988798 | 7/2017 |
| CN | 107205622 | 9/2017 |
| CN | 107468339 A | 12/2017 |
| CN | 108356747 | 8/2018 |
| CN | 108472025 | 8/2018 |
| CN | 207941781 | 10/2018 |
| CN | 108890656 | 11/2018 |
| CN | 108972527 | 12/2018 |
| CN | 109068938 | 12/2018 |
| CN | 109476019 | 3/2019 |
| CN | 109561935 | 4/2019 |
| CN | 109716194 | 5/2019 |
| CN | 110001286 | 7/2019 |
| CN | 110462169 | 11/2019 |
| CN | 110529254 | 12/2019 |
| CN | 110757412 | 2/2020 |
| CN | 111037602 | 4/2020 |
| CN | 111486008 | 8/2020 |
| CN | 113146599 | 7/2021 |
| CN | 113232042 | 8/2021 |
| DE | 3504824 | 8/1986 |
| DE | 4102211 | 8/1991 |
| DE | 29902753 U | 6/1999 |
| DE | 10160922 | 5/2003 |
| DE | 102013202616 A1 | 8/2014 |
| DE | 102015006330 | 11/2016 |
| DE | 102019002892 A1 * | 10/2020 |
| DE | 102020106508 | 9/2021 |
| EP | 1216797 | 6/2002 |
| EP | 1216797 A1 | 6/2002 |
| EP | 1489269 A2 | 12/2004 |
| EP | 1574675 A2 | 9/2005 |
| EP | 2011619 A2 | 1/2009 |
| EP | 1914010 A3 | 9/2010 |
| EP | 2237931 A1 | 10/2010 |
| EP | 2267508 | 12/2010 |
| EP | 1967295 B1 | 1/2011 |
| EP | 2320262 | 5/2011 |
| EP | 2052792 A3 | 6/2011 |
| EP | 2353739 A1 | 8/2011 |
| EP | 2375104 | 10/2011 |
| EP | 2286933 B1 | 11/2011 |
| EP | 2275648 B1 | 3/2012 |
| EP | 1903188 B1 | 5/2013 |
| EP | 2597273 A2 | 5/2013 |
| EP | 2629655 | 8/2013 |
| EP | 3061923 A1 | 8/2016 |
| EP | 3072642 A2 | 9/2016 |
| EP | 1908928 B1 | 12/2016 |
| EP | 3153604 A1 | 4/2017 |
| EP | 3176365 A1 | 6/2017 |
| EP | 3572632 | 11/2019 |
| EP | 3572632 A1 | 11/2019 |
| EP | 3879075 | 9/2021 |
| FR | 2956608 | 8/2011 |
| FR | 2956608 A1 | 8/2011 |
| FR | 2995996 A1 | 3/2014 |
| FR | 3082136 A1 | 12/2019 |
| GB | 779248 | 7/1957 |
| GB | 1437405 A | 5/1976 |
| GB | 2199842 | 7/1988 |
| GB | 2228644 A | 8/1990 |
| JP | H10146316 A | 6/1998 |
| JP | 2006184832 A | 7/2006 |
| JP | 2013510339 A | 3/2013 |
| MX | 2010013223 A1 | 12/2010 |
| NO | 162227 B | 8/1989 |
| TW | 201341090 | 10/2013 |
| WO | 9116598 A1 | 10/1991 |
| WO | 0006336 A1 | 2/2000 |
| WO | 2009081164 A1 | 7/2009 |
| WO | 2011092891 | 8/2011 |
| WO | 2012054829 | 4/2012 |
| WO | WO2012/042921 A1 | 4/2012 |
| WO | WO2012/054829 A2 | 8/2013 |
| WO | 2016063074 | 4/2016 |
| WO | 2016063074 A2 | 4/2016 |
| WO | 2017037723 | 3/2017 |
| WO | 2017221982 A1 | 12/2017 |
| WO | 2018001967 A1 | 1/2018 |
| WO | 2019076876 | 4/2019 |
| WO | 2019076876 A1 | 4/2019 |
| WO | 2019097688 | 5/2019 |
| WO | 2020022474 A1 | 1/2020 |
| WO | 2020030516 A1 | 2/2020 |
| WO | 2021040376 | 3/2021 |
| WO | 2021040376 A1 | 3/2021 |

OTHER PUBLICATIONS

Wickham et al., High Heat Flux Surface Coke Deposition and Removal Assessment, Technical Paper, Air Force Research Laboratory, Edwards AFB, Jan. 2015, California, 21 Pages.
Mascarenas et al., "A Compliant Mechanism for Inspecting Extremely Confined Spaces" Smart Materials and Structures, vol. No. 26, pp. 1-16, Oct. 26, 2017.
U.S. Appl. No. 16/750,665; Non-Final Rejection mailed Jul. 20, 2022; (pp. 1-9).
U.S. Appl. No. 16/577,331; Notice of Allowance and Fees Due (PTOL-85) mailed Jul. 25, 2022; (pp. 1-5).
U.S. Appl. No. 16/735,191; Non-Final Rejection mailed Aug. 3, 2022; (pp. 1-11).
U.S. Appl. No. 16/751,802; Final Rejection mailed Jul. 28, 2022; (pp. 1-9).
FET20 (Wireless Borescope, Klein Tools, Jan. 2019) (Year: 2019).
Mascarenas, et al., A compliant mechanism for inspecting extremely confined spaces, Smart Materials and Structures, Oct. 26, 2017, vol. 26, 26 pgs.
U.S. Appl. No. 16/696,025; Final Rejection mailed Sep. 16, 2022; (pp. 1-34).
U.S. Appl. No. 16/696,025, filed Nov. 26, 2019.
U.S. Appl. No. 16/750,665, filed Jan. 23, 2020.
U.S. Appl. No. 16/750,743, filed Jan. 23, 2020.
U.S. Appl. No. 16/751,802, filed Jan. 24, 2020.
U.S. Appl. No. 16/813,829, filed Mar. 10, 2020.
U.S. Appl. No. 16/898,629, filed Jun. 11, 2020.
U.S. Appl. No. 17/144,487, filed Jan. 8, 2021.
U.S. Appl. No. 15/986,958, filed May 23, 2018.
U.S. Final Office Action from U.S. Appl. No. 15/986,958 dated Sep. 9, 2020, 10 pgs.
U.S. Non-Final Office Action from U.S. Appl. No. 15/986,958 dated Apr. 23, 2020, 12 pgs.
U.S. Notice of Allowance and Notice of Allowability, dated Nov. 18, 2020, from U.S. Appl. No. 15/986,958, 9 pgs.
U.S. Appl. No. 16/898,629; Non-Final Rejection mailed Sep. 13, 2022; (pp. 1-14).
U.S. Appl. No. 16/751,802; Notice of Allowance and Fees Due (PTOL-85) mailed Oct. 19, 2022; (pp. 1-7).
U.S. Appl. No. 16/750,743; Non-Final Rejection mailed Apr. 27, 2022; (pp. 1-12).
U.S. Appl. No. 16/577,331; Non-Final Rejection mailed Jan. 19, 2022; (pp. 1-8).
U.S. Appl. No. 16/751,802; Non-Final Rejection mailed Feb. 28, 2022; (pp. 1-12).
U.S. Appl. No. 16/750,743; Final Rejection mailed Nov. 7, 2022; (pp. 1-28).
U.S. Appl. No. 16/577,331; Notice of Allowance and Fees Due (PTOL-85) mailed Nov. 7, 2022; (pp. 1-16).
U.S. Appl. No. 16/750,743; Final Rejection mailed Nov. 7, 2022; (pp. 1-13).
U.S. Appl. No. 16/577,331; Notice of Allowance and Fees Due (PTOL-85) mailed Nov. 7, 2022; (pp. 1-5).

(56) References Cited

OTHER PUBLICATIONS

U.S. Appl. No. 16/750,665; Notice of Allowance and Fees Due (PTOL-85) mailed Nov. 17, 2022 (pp. 1-5).
U.S. Appl. No. 16/735,191; Notice of Allowance and Fees Due (PTOL-85) mailed Dec. 8, 2022; (pp. 1-8).
U.S. Appl. No. 16/577,268; Non-Final Rejection mailed Jan. 20, 2023; (pp. 1-29).
U.S. Appl. No. 16/577,331; Notice of Allowance and Fees Due (PTOL-85) mailed Feb. 15, 2023; (pp. 1-5).
U.S. Appl. No. 16/750,743; Notice of Allowance and Fees Due (PTOL-85) mailed Jan. 23, 2023; (pp. 1-5).
U.S. Appl. No. 16/751,802; Notice of Allowance and Fees Due (PTOL-85) mailed Feb. 6, 2023; (pp. 1-5).
U.S. Appl. No. 16/751,802; Supplemental Notice of Allowance mailed Feb. 27, 2023; (pp. 1-4).
U.S. Appl. No. 16/898,629; Final Rejection mailed Feb. 28, 2023; (pp. 1-22).
U.S. Appl. No. 17/824,691; Notice of Allowance and Fees Due (PTOL-85) mailed Jun. 21, 2023;(pp. 1-9).
U.S. Appl. No. 16/898,629; Final Office Action mailed Oct. 10, 2023; (pp. 1-12).
U.S. Appl. No. 17/824,691; Notice of Allowance and Fees Due (PTOL-85) mailed Oct. 10, 2023; (pp. 1-8).
U.S. Appl. No. 16/577,268; Non-Final Rejection mailed Oct. 19, 2023; (pp. 1-30).
U.S. Appl. No. 16/696,025; Final Rejection mailed Dec. 28, 2023; (pp. 1-15).
U.S. Appl. No. 16/898,629; Notice of Allowance and Fees Due (PTOL-85) mailed Jan. 17, 2024; (pp. 1-7).
U.S. Appl. No. 15/812,004, filed Nov. 14, 2017.
U.S. Appl. No. 15/914,469, filed Mar. 7, 2018.
U.S. Appl. No. 16/008,475; Final Rejection mailed Mar. 2, 2023; (pp. 1-21).
U.S. Appl. No. 16/008,475; Final Rejection mailed Aug. 4, 2022; (pp. 1-8).
U.S. Appl. No. 16/008,475; Final Rejection mailed Dec. 15, 2023; (pp. 1-24).
U.S. Appl. No. 16/008,475; Non-Final Rejection mailed Jun. 15, 2023; (pp. 1-23).
U.S. Appl. No. 16/008,475; Non-Final Rejection mailed Oct. 21, 2022; (pp. 1-18).
U.S. Appl. No. 16/577,268; Notice of Allowance and Fees Due (PTOL-85) mailed Feb. 26, 2024; (pp. 1-12).
U.S. Appl. No. 17/144,435; Non-Final Rejection mailed Mar. 11, 2024; (pp. 1-12).
U.S. Appl. No. 17/552,848; Requirement for Restriction/Election mailed Feb. 26, 2024; (pp. 1-8).
U.S. Appl. No. 18/328,076; Non-Final Rejection mailed Feb. 27, 2024; (pp. 1-14).
U.S. Appl. No. 16/696,025; Final Rejection mailed Aug. 13, 2024; (pp. 1-25).
Bakhshi, M et al., Tunnel Segmental Lining Geometry, Tolerance and Measurement, Tunnelling & Trenchless Conference, 2018, 10 pp.
U.S. Appl. No. 16/008,475; Non-Final Rejection mailed Apr. 22, 2024; (pp. 1-33).
U.S. Appl. No. 16/577,268; Non-Final Rejection mailed Jun. 10, 2024; (pp. 1-28).
U.S. Appl. No. 16/696,025; Non-Final Rejection mailed May 7, 2024; (pp. 1-25).
U.S. Appl. No. 17/552,848; Non-Final Rejection mailed Jun. 21, 2024; (pp. 1-38).
U.S. Appl. No. 16/008,475; Final Rejection mailed Nov. 4, 2024; (pp. 1-50).
U.S. Appl. No. 16/577,268; Notice of Allowance and Fees Due (PTOL-85) mailed Sep. 13, 2024; (pp. 1-15).
U.S. Appl. No. 16/577,268; Notice of Allowance and Fees Due (PTOL-85) mailed Nov. 20, 2024; (pp. 1-15).
U.S. Appl. No. 17/552,848; Final Rejection mailed Oct. 28, 2024; (pp. 1-23).
U.S. Appl. No. 18/328,076; Final Rejection mailed Sep. 24, 2024; (pp. 1-12).
U.S. Appl. No. 18/328,076; Notice of Allowance and Fees Due (PTOL-85) mailed Dec. 13, 2024; (pp. 1-8).
U.S. Appl. No. 18/328,076; Notice of Allowance and Fees Due (PTOL-85) mailed Dec. 26, 2024; (pp. 1-5).
U.S. Appl. No. 18/733,557, filed Jun. 4, 2024, entitled "Selectively Flexible Extension Tool".
U.S. Appl. No. 16/577,268; Notice of Allowance mailed Sep. 13, 2024; (pp. 1-16).
U.S. Appl. No. 16/577,331; Notice of Allowance and Fees Due (PTOL-85) mailed May 26, 2023; (pp. 1-5).
U.S. Appl. No. 16/696,025; Non-Final Rejection mailed Mar. 28, 2023; (pp. 1-29).
U.S. Appl. No. 16/735,191; Notice of Allowance and Fees Due (PTOL-85) mailed Mar. 27, 2023 (pp. 1-5).
U.S. Appl. No. 16/750,665; Notice of Allowance and Fees Due (PTOL-85) mailed Mar. 24, 2023; (pp. 1-6).
U.S. Appl. No. 16/750,743; Notice of Allowance and Fees Due (PTOL-85) mailed May 16, 2023; (pp. 1-5).
U.S. Appl. No. 16/898,629; Non-Final Rejection mailed Jun. 7, 2023; (pp. 1-14).
U.S. Appl. No. 16/577,268; Final Rejection mailed Jul. 3, 2023; (pp. 1-26).
DE4102211A1 English Translation (Year: 1991).
USPTO; U.S. Appl. No. 16/696,025; Final Rejection mailed Mar. 18, 2025; (pp. 1-30).
USPTO; U.S. Appl. No. 16/696,025; Non-Final Rejection mailed Jan. 14, 2025; (pp. 1-28).
USPTO; U.S. Appl. No. 16/696,025; Non-Final Rejection mailed Jun. 3, 2025; (pp. 1-25).
USPTO; U.S. Appl. No. 17/144,435; Notice of Allowance mailed Apr. 23, 2025; (pp. 1-7).
USPTO; U.S. Appl. No. 17/144,435; Final Rejection mailed Jan. 24, 2025; (pp. 1-12).
USPTO; U.S. Appl. No. 17/144,435; Notice of Allowance and Fees Due (PTOL-85) mailed Apr. 23, 2025; (pp. 1-7).
USPTO; U.S. Appl. No. 18/328,076; Notice of Allowance and Fees Due (PTOL-85) mailed Jan. 14, 2025; (pp. 1-5).
USPTO; U.S. Appl. No. 18/328,076; Notice of Allowance and Fees Due (PTOL-85) mailed Feb. 25, 2025; (pp. 1-5).
USPTO; U.S. Appl. No. 16/696,025; Notice of Allowance and Fees Due (PTOL-85) mailed Jul. 11, 2025; (pp. 1-10).
USPTO; U.S. Appl. No. 18/649,333; Non-Final Rejection mailed Jul. 18, 2025; (pp. 1-12).

* cited by examiner

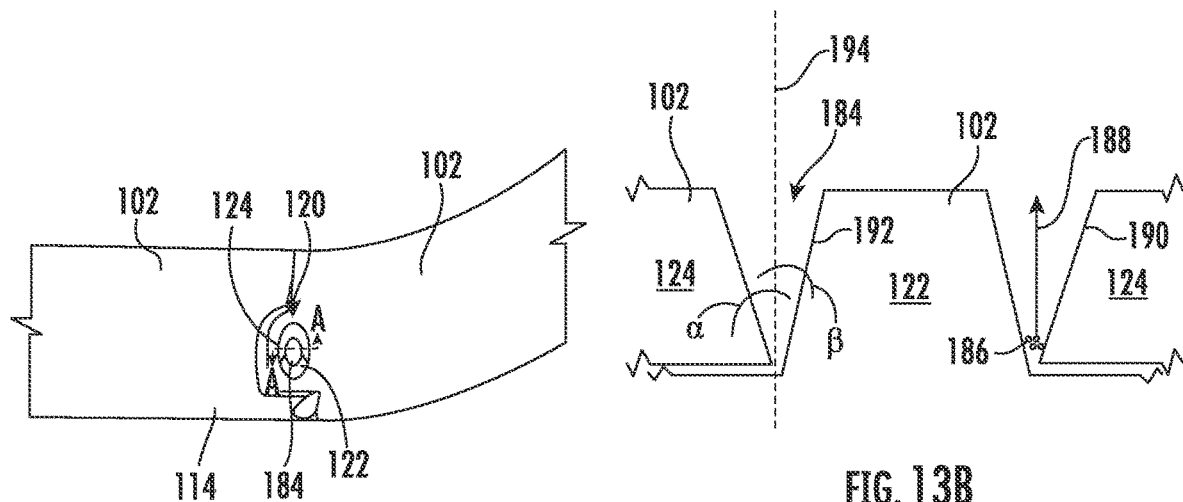
FIG. 13A
FIG. 13B
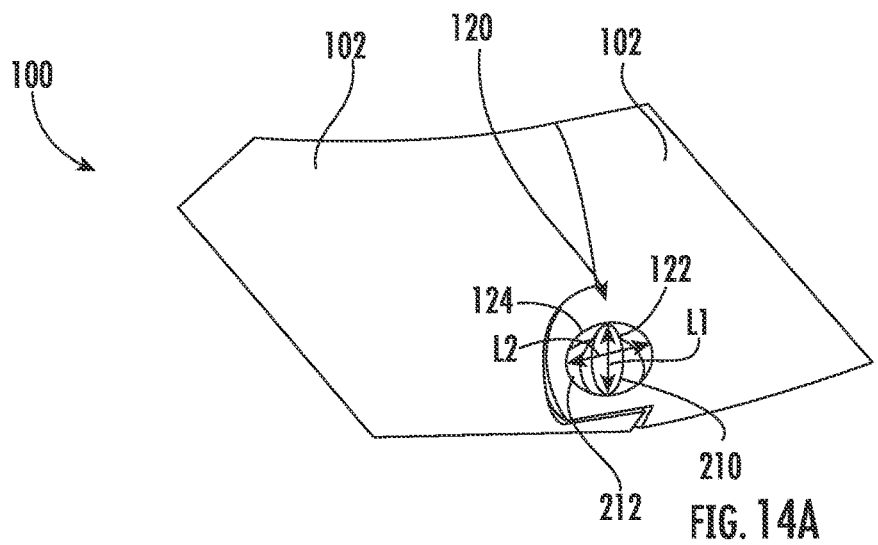
FIG. 14A
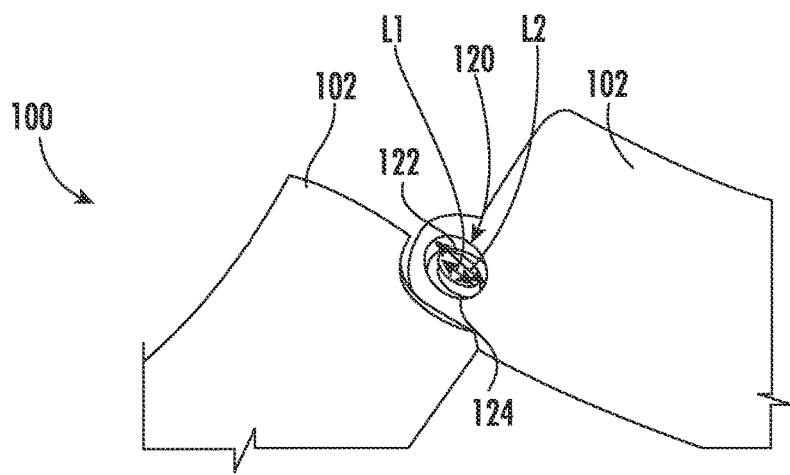
FIG. 14B

INSERTION TOOL

FIELD

The present subject matter relates generally to a tool for inspecting an environment and/or performing maintenance operations on a component within the environment, such as within an annular space in a turbine engine.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Within one or more of the sections, at least certain gas turbine engines define an annular opening. Certain of these annular openings may vary in size, such that a dedicated, specialized insertion tool must be utilized with each annular opening to extend around and through such annular opening.

The inventors of the present disclosure have come up with an insertion tool that may be inserted into an annular opening. The insertion tool that the inventors have come up with may benefit from the inclusion of relatively complex geometries and features. Accordingly, an insertion tool formed in a manner that meets these needs would be useful.

BRIEF DESCRIPTION

Aspects and advantages of the invention will be set forth in part in the following description, or may be obvious from the description, or may be learned through practice of the invention.

In one exemplary embodiment of the present disclosure, an insertion tool for performing an operation on equipment, the insertion tool comprising: a plurality of segments, each segment of the plurality of segments including a body comprising: a first hinge member; and a second hinge member, the first hinge member of a first segment being coupled to the second hinge member of a second segment adjacent to the first segment through an interface, wherein the interface comprises a powder gap, a multi-modal interface, a compliance feature, a displace-to-lock configuration, an interference fit, or any combination thereof.

According to another exemplary embodiment, an insertion tool for performing an operation on equipment, the insertion tool comprising: a plurality of segments, each segment of the plurality of segments including a body comprising: a first hinge member; and a second hinge member, the first hinge member of a first segment being coupled to the second hinge member of a second segment adjacent to the first segment through an interface, wherein the interface comprises a powder gap, a multi-modal interface, a compliance feature, a displace-to-lock configuration, an interference fit, or any combination thereof; and a strength member intersecting the interface.

According to another exemplary embodiment, a method of forming an insertion tool, the method comprising: additively forming bodies of segments of the insertion tool; and flexing adjacent segments of the insertion tool relative to one another such that powder contained at an interface between adjacent segments of the insertion tool can pass from the interface through a powder gap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 13A is a side view of an interface between adjacent segments of an insertion tool in accordance with an exemplary embodiment of the present disclosure as seen in a rigidized configuration.

FIG. 13B is an enlarged schematic view of an interface between adjacent segments of an insertion tool in accordance with an exemplary embodiment of the present disclosure as seen in a rigidized configuration.

FIG. 14A is a side view of an interface between adjacent segments of an insertion tool in accordance with an exemplary embodiment of the present disclosure as seen in a rigidized configuration.

FIG. 14B is a side view of an interface between adjacent segments of an insertion tool in accordance with an exemplary embodiment of the present disclosure as seen in a non-rigidized configuration.

Figure 1:
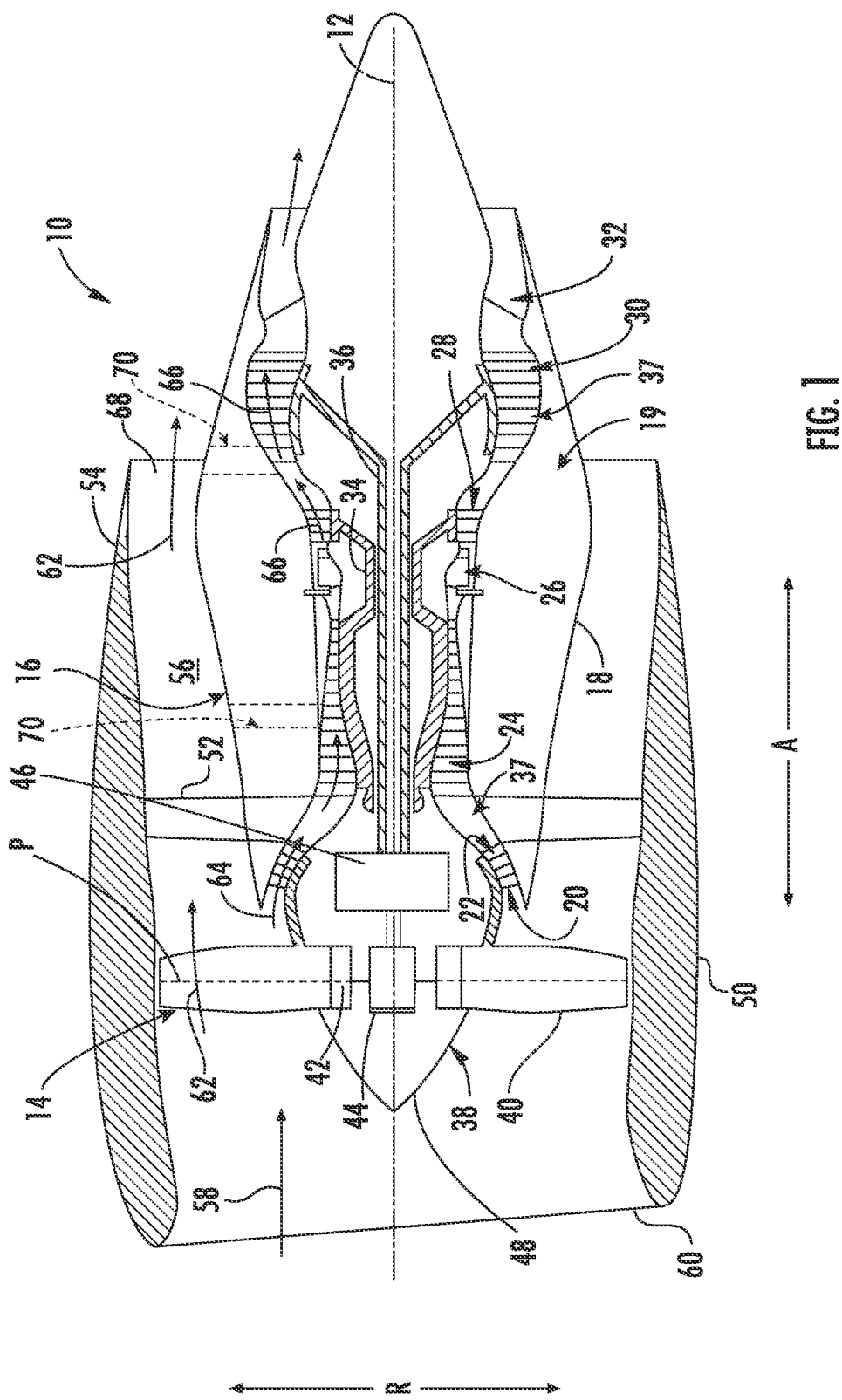
FIG. 1 is a cross-sectional schematic view of a high-bypass turbofan jet engine in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, an insertion tool in accordance with one or more embodiments described herein can be configured to permit an operator or robotic assembly to service (e.g., inspect and/or repair) a cavity, such as an internal volume of a gas turbine engine. The insertion tool can generally include a plurality of adjacent segments which are selectively rigidizable with respect to one another so as to permit a distal end of the insertion tool access to a confined cavity of the equipment through a complex pathway. Adjacent segments can define hinge members which together form an interface between the adjacent segments. The hinge members can include features to enhance operation of the insertion tool during use, such as when inserting the insertion tool into the internal volume of the gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction C (see FIG. 3) extending circumferentially about the axial direction A. In general, the turbofan 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP)

shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It will be appreciated that although not depicted in FIG. 1, the turbofan engine 10 may further define a plurality of openings allowing for inspection of various components within the turbomachine 16. For example, the turbofan engine 10 may define a plurality of borescope openings at various axial positions within the compressor section, combustion section 26, and turbine section. Additionally, as will be discussed below, the turbofan engine 10 may include one or more igniter ports within, e.g., the combustion section 26 of the turbomachine 16, that may allow for inspection of the combustion section 26.

It should further be appreciated that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
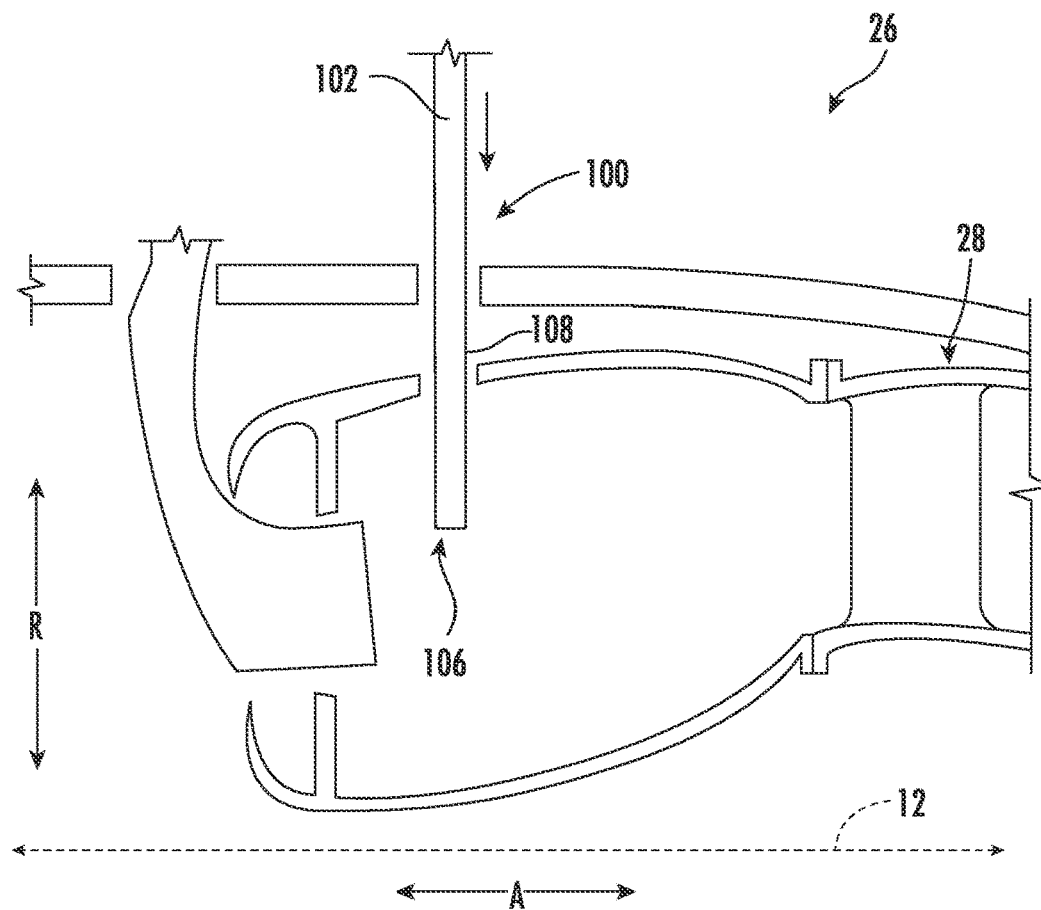
FIG. 2 is a close-up, cross-sectional view of a combustion section of the exemplary gas turbine engine of FIG. 1 including an insertion tool in accordance with an exemplary embodiment of the present disclosure, along an axial direction and a radial direction.
Figure 3:
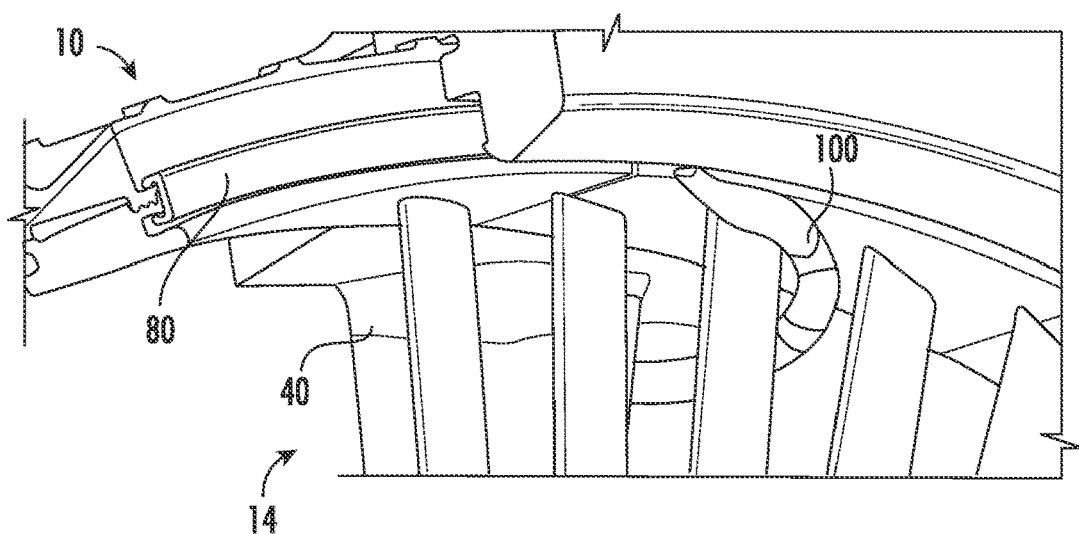
FIG. 3 is another close-up, cross-sectional view of the combustion section of the exemplary gas turbine engine of FIG. 1 including the exemplary insertion tool, along the radial direction and a circumferential direction.

Referring now to FIG. 2, a close-up, schematic view of the combustion section 26 of the turbomachine 16 of the exemplary gas turbine engine 10 of FIG. 1 is provided along with a tool 100 for insertion into an annular section of the engine 10. It will be appreciated that although the tool 100 is depicted in FIG. 2 as being inserted into a combustion section 26, in other exemplary embodiments, the tool 100 may additionally, or alternatively, be inserted into other areas of the turbofan engine 10 having an annular shape or other shape. In other embodiments, the tool 100 may be inserted into annular sections of the compressor section or the turbine section, or alternatively still, other engines or systems altogether. For example, FIG. 3 illustrates an embodiment of the tool 100 being inserted into a high pressure (HP) turbine, such as the high pressure turbine 28 previously described. The tool 100 can be inserted into a bore of the engine 10 and passed through the fan section 14, including fan blades 40, until reaching an inner portion of the engine 100 corresponding with HP turbine stage-2 C-clips 80. Certain tool geometry may permit passage of the tool 100 through the high pressure turbine 28 to the desired location of service. The tool 100 can inspect and/or operate on the HP turbine stage 2 C-clips 80 which can be subject to premature failure, resulting in excess aircraft downtime. Additionally or alternatively, still, the tool 100 may be inserted into a non-annular section. For the embodiment of FIG. 3, the tool 100 capable of insertion into an annular section of an engine is depicted extending through a borescope into the HP turbine 28.

Figure 4:
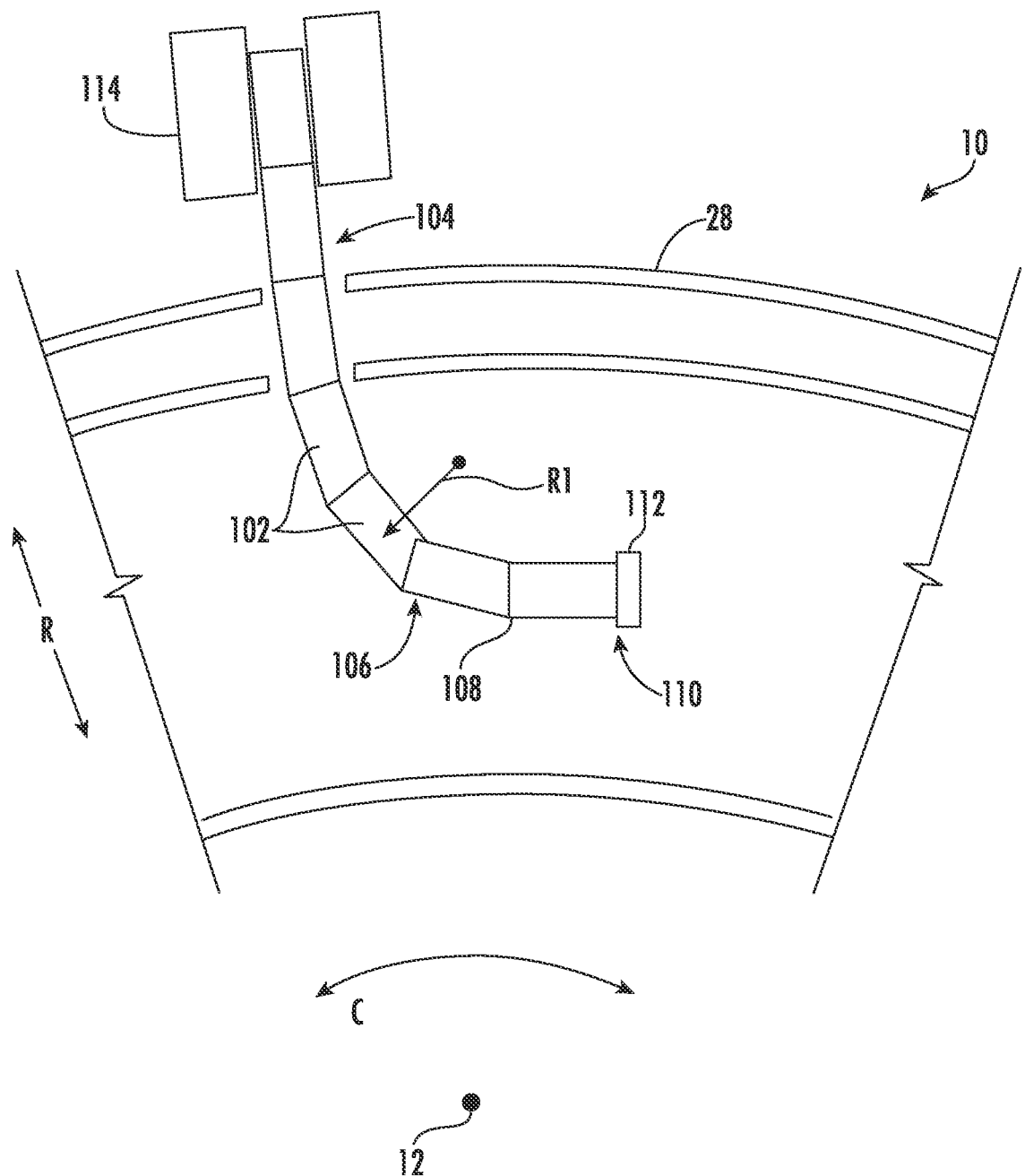
FIG. 4 is a perspective view of an insertion tool in accordance with an exemplary embodiment of the present disclosure.

Referring now also to FIG. 4, providing a partial, axial cross-sectional view of the HP turbine 28 of FIG. 3, it will be appreciated that the tool 100 generally includes a plurality of segments 102 movable into the engine 10. Each of the plurality of segments 102 can be aligned so as to form a continuous tool 100. In the rigidized configuration, the plurality of segments 102 can be coupled together such that the tool 100 has a generally rigid structure. That is, the plurality of segments 102 can act like a rigid body exhibiting sufficient structural stiffness so as to maintain a desired shape while moving and/or operating within the engine 10, e.g., the HP turbine 28. As illustrated in FIG. 4 and according to certain embodiments, the tool 100 can remain in a one- or two-dimensional spatial arrangement. That is, the tool 100 may not twist, e.g., helically, in a third-dimension of, e.g., a cartesian coordinate system. In other embodiments described herein, the tool 100 may exhibit three-dimensional bending. In one or more embodiments, the tool 100 may be inserted into the engine 10 while having a semi-flaccid configuration. In such a manner, the tool 100 may more readily pass through one or more obstacles in the engine 10. Once past the obstacles, the tool 100 may be fully rigidized.

In certain instances, the tool 100 can define one or more linear portions 104 and one or more bent portions 106 when in use. Bent portions 106 can be created, for example, at interfaces 108 between adjacent segments 102. Alternatively, bent portions 106 can be internal to the shape of at least some of the segments 102. That is, for example, one or more of the segments 102 can define a bent shape that creates a bend in the tool 100 when in the rigidized configuration. The bent portions 106 can define radii of curvature, e.g., $R_1$. The radius of curvature of the illustrated bent portion 106 can be disposed within a single plane. That is, for example, as described above, the radius of curvature of the bent portion 106 of the tool 100 can be defined by a single plane.

A distal end 110 of the tool 100 can include an implement, which for the embodiment depicted is a camera 112, to allow for inspection of various components of the high pressure turbine 28, like the aforementioned C-clips 80 and the like. It will be appreciated, however, that the insertion tool 100 may include any other suitable implement, such that the insertion tool 100 may be utilized for any suitable purpose. For example, the insertion tool 100 may be utilized to inspect the interior of the engine using, e.g., the camera 112. Additionally, or alternatively, the insertion tool 100 may include various other tool implements to perform one or more maintenance operations within the interior of the engine (e.g., drilling, welding, heating, cooling, cleaning, spraying, etc.).

Further, the exemplary insertion tool 100 can include a drive assembly 114 for driving the insertion tool 100 into, or out of, the interior of the engine, and more specifically for the embodiment shown, into or out of the HT turbine 28. The drive assembly 114 may be operably coupled to a controller or other control device, such that a length of the insertion tool 100 within the interior of the engine 10 may be controlled with relative precision by the drive assembly 114. In certain embodiments, the drive assembly 114 can include a motor, servo-motor, or the like configured to drive the tool 100 relative to the engine 10. In other instances, the drive assembly 114 can include a manual interface configured to permit an operator to manually move the tool 100. As described hereinafter, the drive assembly 114 can be a selective rigidizer configured to selectively rigidize the tool 100 to a desired shape.

Figure 5:
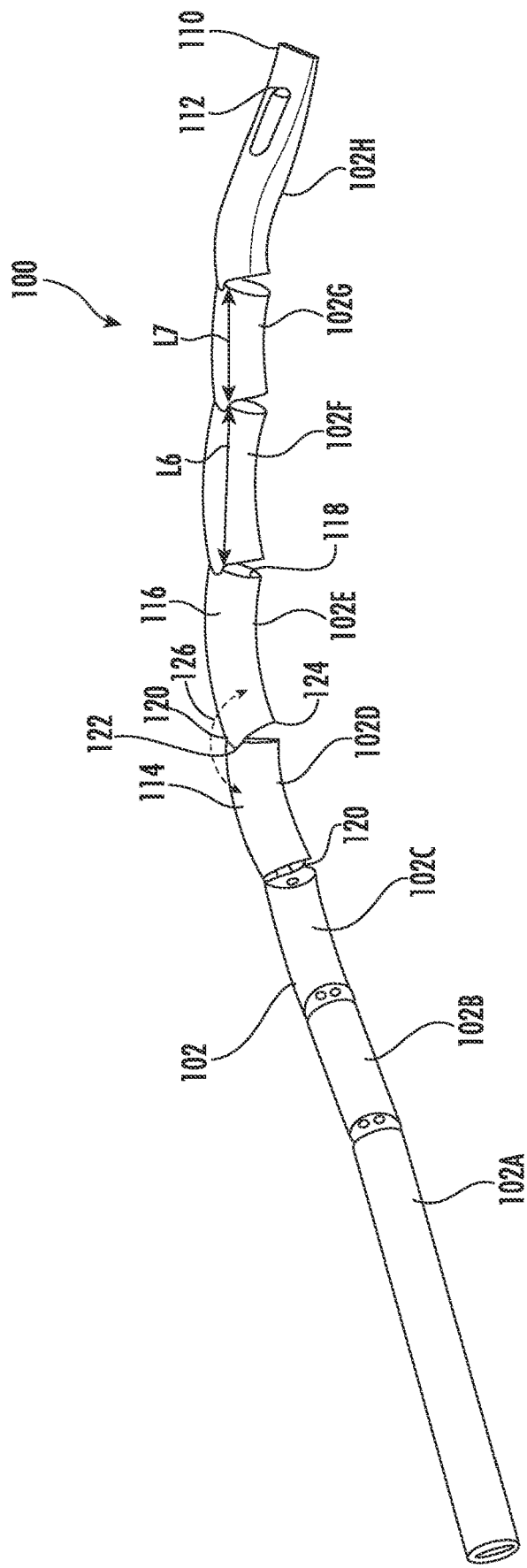
FIG. 5 is a perspective view of an insertion tool in accordance with an exemplary embodiment of the present disclosure.

FIG. 5 illustrates a perspective view of the tool 100 as seen in accordance with an exemplary embodiment in the flaccid, e.g., non-rigid, configuration. The tool 100 includes segments 102, such as a first segment 102A, a second segment 102B, a third segment 102C, a fourth segment 102D, a fifth segment 102E, a sixth segment 102F, a seventh segment 102G, and an eighth segment 102H. While the illustrated embodiment depicts the tool 100 as including eight segments 102, the number of segments 102 may be varied. For instance, the tool 100 can include at least two segments, such as at least three segments, such as at least four segments, such as at least five segments, such as at least six segments, such as at least seven segments, such as at least eight segments, such as at least nine segments, such as at least ten segments, such as at least fifteen segments, such as at least twenty segments, such as at least thirty segments, such as at least forty segments, and so on. In an embodiment, at least two of the plurality of segments 102 can have same, or similar, shapes as compared to one another. That is, for instance, the at least two segments 102 can have bodies 114 defining same, or similar, sidewalls 116 and/or ends 118 as compared to one another. In a more particular embodiment, all of the plurality of segments 102 can share a common body shape, or a particular aspect of body shape. For instance, all of the plurality of segments 102 can have the same sidewall lengths, as measured between opposing ends 118, all of the plurality of segments 102 can have a same general sidewall shape, or the like. In another embodiment, at least two of the plurality of segments 102 can have different shapes as compared to one another. For instance, the bodies 114 of at least two segments can have different lengths as compared to one another, different circumferential dimensions as compared to one another, different ends 118, or the like. By way of non-liming example, the seventh segment 102G depicted in FIG. 5 has a length $L_7$ that is less than a length $L_6$ of the sixth segment 102F. By way of another non-limiting example, the first segment 102A can be formed of a first material and the second segment 102B can be formed of a second material different than the first material. By way of yet another non-limiting example, the first segment 102A can be formed using a particular manufacturing process or manufacturing tolerance different from the manufacturing process or tolerance of the second segment 102B. For instance, the first segment 102A can have a lower tolerance, or resolution, than the second segment 102B. In certain instances, the segments 102 can be formed using an additive manufacturing process, such as three-dimensional printing. The first segment 102A can have a lower print resolution as compared to the print resolution of the second segment 102B, the third segment 102C, and so on. This may occur, for example, where the first segment 102A is a handle or outermost segment which does not require high surface finish characteristics for sliding over or past features of the engine 10 during navigation therethrough.

In one or more embodiments, each pair of adjoining, i.e., neighboring, segments 102 can be attached together through an interface 120. The interface 120 may be disposed at, or adjacent to, ends 118 of the adjacent segments 102. Referring, for example, to the interface 120 between the fourth and fifth segments 102D and 102E, each interface 120 can be formed from a first hinge member 122 associated with one of the segments, e.g., the fourth segment 102D, and a second hinge member 124 associated with the adjacent segment, e.g., the fifth segment 102E. The first and second hinge members 122 and 124 can be joined together to permit relative movement between the adjacent segments 102, e.g., between the fourth segment 102D and the fifth segment 102E. By way of example, the first and second hinge members 122 and 124 can permit relative movement, e.g., rotational movement, of the segments 102 in one or more planes. In a particular embodiment, the interface 120 between a pair of adjacent segments 102 can permit movement of the segments 102 in a single plane. For instance, as illustrated in FIG. 5, the fourth and fifth segments 102D and 102E can be moveable with respect to one another along a plane corresponding with arrow 126. That is, the fourth and fifth segments 102D and 102E can pivot relative to one another along the directions shown by arrow 126 while staying within a single plane of relative motion.

In the illustrated embodiment, the interfaces 120 formed between at least two pairs of adjacent segments 102 can be different from one another. For example, the interface 120 formed between the fourth and fifth segments 102D and 102E is disposed in a first plane of rotation while the interface 120 formed between the second and third segments 102B and 102C is disposed in a second plane of rotation different from the first plane. Accordingly, the angle of rotation of the interface 120 formed between the third and fourth segments 102C and 102D can be different from the angle of rotation of the interface 120 formed between the fourth and fifth segments 102D and 102E. In the non-rigid configuration, as illustrated for example in FIG. 5, such multi-planar interfacing may not materially affect the flaccid shape of the tool 100. However, when rigidized, the multi-planar interfacing depicted in FIG. 5 can result in a tool 100 having a three-dimensional shape for accessing certain areas of the engine 10 or similar structure being serviced (inspected and/or operated upon).

A distal segment of the tool 100, such as the eighth segment 102H in the depicted embodiment, can have a dissimilar shape as compared to the other segments 102 for purpose of permitting servicing operations. In the illustrated embodiment, the eighth segment 102H is depicted as having a tapered profile with a minimum width disposed at or adjacent to a distal end 110 of the tool 100. In such a manner, the tool 100 may be more readily fed into the equipment being serviced, e.g., the aircraft engine. Moreover, the tapered profile may permit the implement, e.g., camera 112, to exit an internal volume of the tool 100 (described in greater detail below) so as to perform an operation during the service without requiring the diameter of the tool 100 to change.

Figure 6:
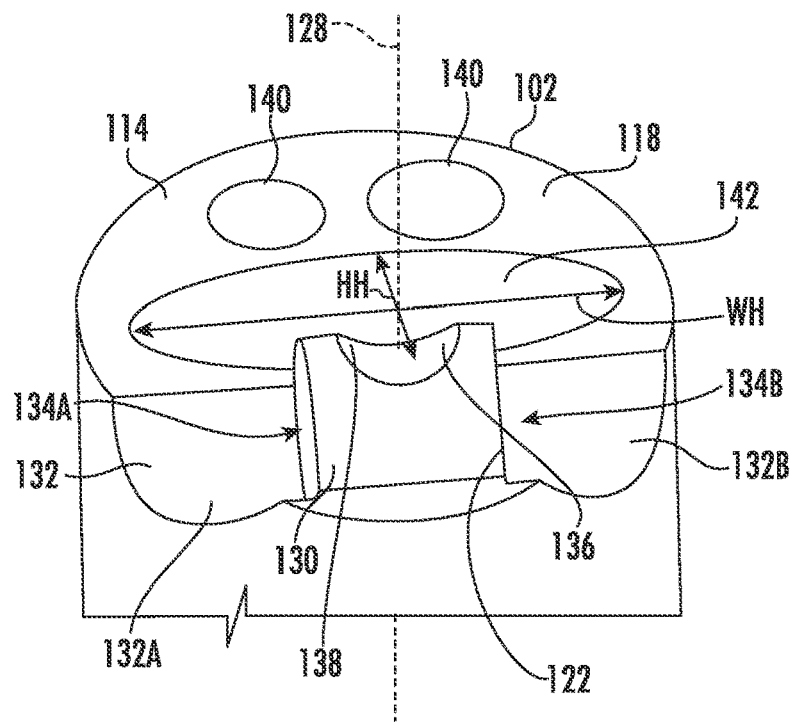
FIG. 6 is an enlarged view of an end of a segment of an insertion tool in accordance with an exemplary embodiment of the present disclosure.
Figure 7:
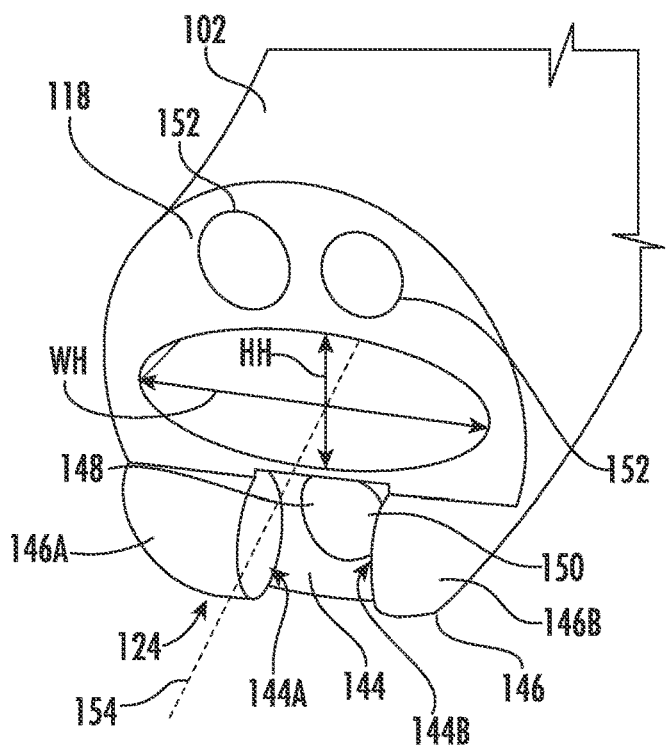
FIG. 7 is an enlarged view of another end of a segment of an insertion tool in accordance with an exemplary embodiment of the present disclosure.

FIGS. 6 and 7 illustrate ends 118 of adjoining, i.e., neighboring, segments 102. The ends 118 can be matched to one another such that the interface 120 (FIG. 5) therebetween moves in a predetermined manner, e.g., in a predetermined plane as compared to other interfaces 120 formed between other pairs of segments 102.

In an embodiment, the body 114 of at least one of the segments 102 can be formed through an additive manufacturing process, such as by way of non-limiting example, can include three-dimensional printing. Bodies 114 in accordance with some embodiments described herein can thus include indicia of the three-dimensional printing manufacturing process in the form of indicia, including stratum, e.g., layers, formed in the body 114 corresponding with individually stepped printing layers. In certain embodiments described herein, all segments 102 of the tool 100 can be formed using additive manufacturing processes, e.g., three-dimensional printing techniques. In a particular embodiment, the segments 102 can be additively manufactured simultaneously while already in the interfaced configuration. That is, adjacent segments 102 can be additively formed in engaged position relative to one another.

Referring initially to FIG. 6, the exemplary segment 102 depicted may refer to any one or more of the aforementioned segments 102 (e.g., the first segment 102A, the second segment 102B, the third segment 102C, and so on). The body 114 of the segment 102 defines the first hinge member 122 of the interface 120 (FIG. 5). The first hinge member 122 is laterally offset from a central axis 128 of the body 114 in a radial direction. That is, the first hinge member 122 may not be centrally disposed with respect to the body 114. In accordance with the particular embodiment depicted in FIG. 6, the first hinge member 122 generally includes a central structure 130 and a channel 132 disposed adjacent thereto. The channel 132 is a split channel, including a first channel portion 132A and a second channel portion 132B. The central structure 130 is disposed between the first and second channel portions 132A and 132B. In an embodiment, the first and second channel portions 132A and 132B can have the same, or similar, shapes and/or sizes as compared to one another. In another embodiment, the first and second channel portions 132A and 132B can have different shapes and/or sizes as compared to one another. The central structure 130 can define opposite surfaces 134A and 134B spaced apart from one another by a thickness of the central structure 130. The opposite surfaces 134A and 134B can form end walls of the first and second channel portions 132A and 132B. As described below with respect to FIG. 7, the opposite surfaces 134A and 134B can be engaged with complementary surfaces of the second hinge member 124 to form the interface 120 between the adjacent segments 102.

The body 114 of the segment 102 illustrated in FIG. 6 further includes a cavity 136. The cavity 136 extends through the length of the segment 102 and can emerge from the body 114 at two or more exit locations, such as at exit location 138. In the illustrated embodiment, the exit location 138 is shown intersecting the first hinge member 122. That is, for example, the exit location 138 can emerge from the body 114 at an exit location transverse, or generally transverse, to an axis of rotation of the interface 120 through the first hinge member 122. A second exit location (not illustrated) of the cavity 136 can exit the body 114 of the segment 102 through the a second hinge member of the segment 102. In such a manner, at least one of the bodies 114 can include both first and second hinge members 122 and 124 and the cavity 136 can exit the body 114 through the first and second hinge members 122 and 124. The cavity 136 can define a constant, or generally constant, cross-sectional shape along the length of the body 114. In certain instances, the cavity 136 can be linear, or generally linear. That is, a longitudinal axis of the cavity 136 can lie along a straight, or generally straight line. As described in greater detail below, the cavity 136 can be configured to receive a strength member. The strength member may form a backbone of the tool 100 offset from the central axis 128 of the segments 102 and thus offset from the central axis of the tool 100. In some embodiments, the strength member can comprise a flexible member, such as, e.g., a tension bearing element, string, memory-laden material defining a predefined shape, or the like. The strength member can allow for flexure of the tool 100 while permitting the tool 100 to return to, e.g., a predefined shape. For example, the tool 100, in a non-rigid configuration, can slide through a predefined volume of an aircraft engine until reaching a desired location. The tool 100 may have to undergo distortion, e.g., bending, to navigate the predefined volume of the aircraft engine. For instance, the tool 100 may have to slide around corners and through shaped passageways to reach the desired location. The strength member can permit the tool to remain in a single, operable piece for sliding into the airplane engine while preventing the tool from becoming jammed or stopped within the predefined volume. The strength member can put the tool 100 in the predefined shape once the tool is positioned at the desired location to permit operation on the engine.

In an embodiment, the strength member can occupy less than an entire areal dimension of the cavity 136. For example, the strength member can be a hollow tube extending through the cavity 136. By way of another example, the strength member can have a cross-sectional shape different from the cavity 136 and/or a size that is smaller than the cavity 136. In such a manner, the cavity 136 can further define space to receive the implement, such as the aforementioned camera 112 therethrough.

In an embodiment, the strength member may include a shape memory alloy (SMA) material. In a more particular embodiment, the strength member can be formed entirely from an SMA material. In yet another particular embodiment, the strength member can be at least partially formed from an SMA material. An SMA is generally an alloy capable of returning to its original shape after being deformed. Further, SMAs may act as a lightweight, solid-state alternative to traditional materials. For instance, certain SMAs may be heated in order to return a deformed SMA to its pre-deformed shape. An SMA may also provide varying stiffness, in a predetermined manner, in response to certain ranges of temperatures. The change in stiffness of the shape memory alloy is due to a temperature related, solid state micro-structural phase change that enables the alloy to change from one physical shape to another physical shape. The changes in stiffness of the SMA may be developed by working and annealing a preform of the alloy at or above a temperature at which the solid state micro-structural phase change of the shape memory alloy occurs. The temperature at which such phase change occurs is generally referred to as the critical temperature or transition temperature of the alloy.

Some shape memory alloys used herein are characterized by a temperature-dependent phase change. These phases include a martensite phase and an austenite phase. The martensite phase generally refers to a lower temperature phase whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the strength member has a first stiffness at a first temperature and has a second stiffness at a second temperature, wherein the second temperature is different from the first temperature. Further, in some embodiments, one of the first temperature and the second temperature is below the transition temperature and the other one may be at or above the transition temperature. Thus, in some embodiments, the first temperature may be below the transition temperature and the second temperature may be at or above the transition temperature, while in some other embodiments, the first temperature may be at or above the transition temperature and the second temperature may be below the transition temperature.

Exemplary but non-limiting examples of SMAs may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA may include a nickel-aluminum based alloys, copper-aluminum-nickel alloy, or alloys containing zinc, copper, gold, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

The body 114 further includes one or more auxiliary cavities 140. In an exemplary embodiment, the auxiliary cavities 140 may be disposed on an opposite side of the central axis 128 as compared to the cavity 136. The one or more auxiliary cavities 140 can include, for example, at least one auxiliary cavity, such as at least two auxiliary cavities, such as at least three auxiliary cavities. In an embodiment, the auxiliary cavities 140 may have one or more same, or similar attributes as compared to one another. For instance, the auxiliary cavities 140 can all share a same radial offset distance from the central axis 128. In another embodiment, the auxiliary cavities 140 may have one or more different attributes as compared to one another. For instance, the auxiliary cavities 140 can have different diameters as compared to one another. As described in greater detail hereinafter, in certain embodiments the auxiliary cavities 140 may be configured to receive one or more support members. In certain instances, one or more selectively rigidizable element(s), e.g., support member(s) and/or strength member, may operate to selectively rigidize the tool 100 and/or help support the tool 100 in the non-rigidized, i.e., flaccid, configuration. For example, where the support members comprise tension bearing materials, e.g., a string, tensioning the support members can result in the tool 100 taking the rigidized configuration. During tensioning of the support members, adjacent segments of the tool 100 may pivot relative to, e.g., around, interfaces 120 until the support members reach a critical tension whereby the tool is rigidized. In certain instances, the strength member may also be selectively rigidizable by applying tension thereto (e.g., FIG. 11). In other embodiments, the selectively rigidizable elements can be selectively rigidizable using a non-tensioning method. For example, selective rigidization can occur through a phase shift, chemical and/or electrical stimulation, and the like.

A hole 142 can be disposed within the body 114 of at least one of the segments 102, such as all of the segments 102, and configured to receive an implement, such as the aforementioned camera 112, for performing an operation at the desired location. In an embodiment, the hole 142 can be centrally, or generally centrally, located relative to the central axis 128 of the body 114. In certain instances, the hole 142 can be disposed at a radial position between the cavity 138 and at least one of the auxiliary cavities 140. The hole 142 can define a non-circular cross section. For instance, the hole 142 can define an ovular cross-sectional profile, a rectangular cross sectional profile, or another shape other than a circle. In certain instances, the hole 142 can be configured to receive an implement, such as a cable connected to a tool, e.g., camera 112, that has a non-circular cross section. By way of example, the cable can be a ribbon cable or another flat, or generally flat, cable. The cable can be configured to bend in a single, or generally single, axis. That is, for instance, the cable can define a planar shape. The planar shape can bend in a direction perpendicular to the planar shape. The hole 142 can be shaped and/or oriented relative to the direction of movement at the interface 120 (FIG. 5) such that the planar cable bends in a direction associated with a direction of movement, e.g., rotation, at the interface 120. In an embodiment, the hole 142 can define an aspect ratio [$W_H:H_H$], as defined by a maximum relative width, $W_H$, of the hole 142, as compared to a maximum relative height, $H_H$, of the hole 142, that is at least 1.5:1, such as at least 2:1, such as at least 3:1, such as at least 4:1, such as at least 5:1, such as at least 7.5:1, such as at least 10:1, such as at least 15:1, such as at least 20:1. In a particular embodiment, the width and height of the hole 142 can be oriented generally perpendicular with respect to one another.

FIG. 7 illustrates an exemplary embodiment of a segment 102 disposed adjacent to the segment 102 illustrated in FIG. 6. The segment 102 illustrated in FIG. 7 includes end 118 having the second hinge member 124 which is configured to engage with the first hinge member 122 described with respect to the segment 102 illustrated in FIG. 6. The second hinge member 124 can be complementary in shape and/or size with respect to the first hinge member 122 so as to permit engagement between the adjacent segments 102 illustrated in FIGS. 6 and 7. Accordingly, the second hinge member 124 can include a central structure 144 and a ridge 146. The central structure 144 can be disposed centrally along the ridge 146. The central structure 144 can split the ridge 146 into a first ridge portion 146A and a second ridge portion 146B. The central structure 144 can be indented into the ridge 146 so as to receive the central structure 130 of the first hinge 120. The central structure 144 can define opposite surfaces 144A and 144B configured to couple with surfaces 134A and 134B of the first hinge 120 so as to form the interface 120.

The body 114 of the segment 102 can further define a cavity 148 configured to receive the strength member exiting the cavity 138 of the adjacent segment 102. The cavity 148 can extend through the length of the segment 102 and emerge from the body 114 at two or more exit locations, such as at exit location 150. In the illustrated embodiment, the exit location 150 is shown intersecting the second hinge member 124. That is, for example, the exit location 150 can emerge from the body 114 at an exit location transverse, or generally transverse, to an axis of rotation of the interface 120 through the second hinge member 124. A second exit location (not illustrated) of the cavity 148 can exit the body 114 of the segment 102 through the first hinge member 122 of the segment 102. In such a manner, the cavity 148 can exit the body 114 through the first and second hinge members 122 and 124. The cavity 148 can define a constant, or generally constant, cross-sectional shape along the length of the body 114. In certain instances, the cavity 148 can be linear, or generally linear. That is, a longitudinal axis of the cavity 148 can lie along a straight, or generally straight line.

The body 114 further includes one or more auxiliary cavities 152. In an exemplary embodiment, the auxiliary cavities 152 may be disposed on an opposite side of a central axis 154 as compared to the cavity 148. The one or more auxiliary cavities 152 can include, for example, at least one auxiliary cavity, such as at least two auxiliary cavities, such as at least three auxiliary cavities. In an embodiment, the auxiliary cavities 152 may have one or more same, or similar attributes as compared to one another. For instance, the auxiliary cavities 152 can all share a same radial offset distance from the central axis 154. In another embodiment, the auxiliary cavities 152 may have one or more different attributes as compared to one another. For instance, the auxiliary cavities 152 can have different diameters as compared to one another. The auxiliary cavities 152 may be configured to receive the aforementioned one or more support members.

A hole 156 can be disposed within the body 114 of the segment 102 and configured to receive the aforementioned implement, e.g., cable, extending through the hole 142 of the adjacent segment 102. In an embodiment, the hole 156 can be centrally, or generally centrally, located relative to the central axis 154 of the body 114. In certain instances, the hole 156 can be disposed at a radial position between the cavity 148 and at least one of the auxiliary cavities 152. The hole 156 can define a non-circular cross section. For instance, the hole 156 can define an ovular cross-sectional profile, a rectangular cross sectional profile, or another shape other than a circle. In certain instances, the hole 156 can be configured to receive an implement, such as a cable connected to a tool, e.g., camera 112, that has a non-circular cross section. By way of example, the cable can be a ribbon cable or another flat, or generally flat, cable. The cable can be configured to bend in a single, or generally single, axis. That is, for instance, the cable can define a planar shape. The planar shape can bend in a direction perpendicular to the planar shape. The hole 156 can be shaped and/or oriented relative to the direction of movement at the interface 120 (FIG. 5) such that the planar cable bends in a direction associated with a direction of movement, e.g., rotation, at the interface 120. In an embodiment, the hole 156 can define an aspect ratio [$W_H:H_H$], as defined by a maximum relative width, $W_H$, of the hole 156, as compared to a maximum relative height, $H_H$, of the hole 156, that is at least 1.5:1, such as at least 2:1, such as at least 3:1, such as at least 4:1, such as at least 5:1, such as at least 7.5:1, such as at least 10:1, such as at least 15:1, such as at least 20:1. In a particular embodiment, the width and height of the hole 156 can be oriented generally perpendicular with respect to one another.

While the above description refers separately to the cavities 136 and 150, the auxiliary cavities 140 and 152, and holes 142 and 156, it should be understood that these aspects can share any common geometry and/or shape as compared to one another. Specifically, the cavities, auxiliary cavities, and holes may be configured to operate together to perform the above-described functions for the tool. As such, these features may be, but are not required to be, common to all segments 102 of the tool 100. Accordingly, reference to particular aspects with respect to one but not all of these elements as it relates to one segment 102 may refer to that same aspect pertaining to all segments 102. Additionally, in another embodiment the cavities 136 and 150 may be part of the same cavity, each auxiliary cavity 140 and 152 can be part of the same auxiliary cavity, and holes 142 and 156 can be part of the same hole. That is, FIG. 6 and FIG. 7 can illustrate different, e.g., opposite, ends of the same segment 102.

Figure 8:
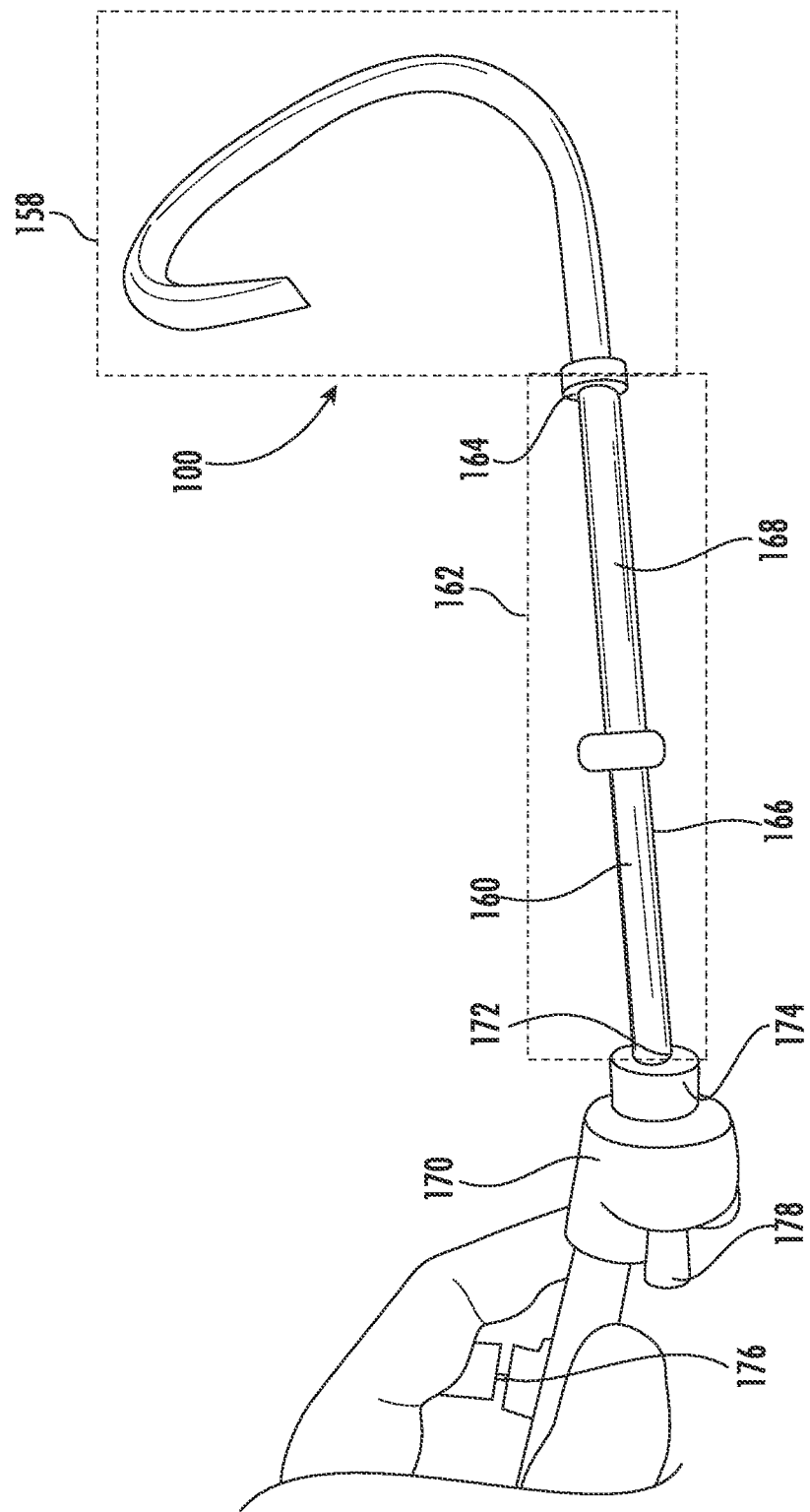
FIG. 8 is a perspective view of an insertion tool in accordance with an exemplary embodiment of the present disclosure.

FIG. 8 illustrates an embodiment of the tool 100 in the rigidized configuration. The tool 100 is contained within box 158. As seen in FIG. 8, according to some embodiments of the present disclosure, the tool 100 can define a complex geometry extending through a three dimensional cartesian coordinate system. That is, the tool 100 may simultaneously extend in the X-, Y-, and Z-axis. The particular shape of the tool 100 can be viewed in response to the shape of the environment in which the tool is to be used within.

The tool 100 can further include an elongated portion 160 shown in box 162. The elongated portion 160 may be connected with the tool 100 to elongate the tool 100 for insertion into certain engine components. The elongated portion 160 may be coupled to the tool 100 at a joint 164. The joint 164 may be a removable joint, such that an operator can install the tool 100 on a plurality of different elongated portions 160 of variable size, shape, or configuration. In certain embodiments, the elongated portion 160 can include a multi-piece construction. For instance, the elongated portion 160 may include a first elongated segment 166 and a second elongated segment 168 coupled together. Accordingly, the operator can select various segments of various shaped, sized, and/or configurations based on the specific application or requirement of the intended use. A handle 170 may be coupled to a proximal end 172 of the elongated portion 160 to permit an operator to hold the tool 100 at a desired location. The handle 170 may include an interface 174 to be engaged with the elongated portion 160. In a non-illustrated embodiment, the handle 170 may be directly coupled with the tool 100. That is, the elongated portion 160 may be omitted in accordance with one or more embodiments.

The handle 170 may include one or more elements configured to permit selective rigidization of the tool 100.

For example, the handle 170 can include a trigger 176 configured to selectively rigidize the tool 100. The trigger 176 can be rotatable, pivotal, translatable, or the like between a disengaged configuration in which the tool 100 is flaccid, i.e., non-rigid, and an engaged configuration in which the tool is rigid. In a particular embodiment, the trigger 176 may include finger grips (not illustrated) which permit an operator to maintain positive contact with the trigger 176 when pushing and pulling the trigger between the engaged and disengaged positions. In another particular embodiment, the trigger 176 may include multi-point contact locations, e.g., two discrete finger grip locations. In an embodiment, the trigger 176 may be selectively lockable in the engaged and/or disengaged positions. Accordingly, the operator can rigidize the tool 100 and release the trigger 176 during servicing operations. In yet a further embodiment, the trigger 176 can be operated by a motor or other power device such that rigidization of the tool 100 does not require the generation of manual pressure. The handle 170 may remain exposed from the engine while the tool 100 is inserted in the engine. In such a manner, the operator can maintain control of the tool 100 without direct access thereto.

The handle 170 can include an orifice 178 or other interface configured to receive an implement for insertion into the engine. The orifice 178 can include, for example, an opening into which the operator can insert the implement, e.g., the aforementioned camera 112 on a cable, into the engine. In certain embodiments, the orifice 178 may be selectively sealable or closable to prevent ingress of dust and other contaminants from entering the tool 100. Once opened, the operator can feed and/or move the implement into or relative to the orifice 178 so as to allow for the servicing operation to be performed as required.

Figure 9:
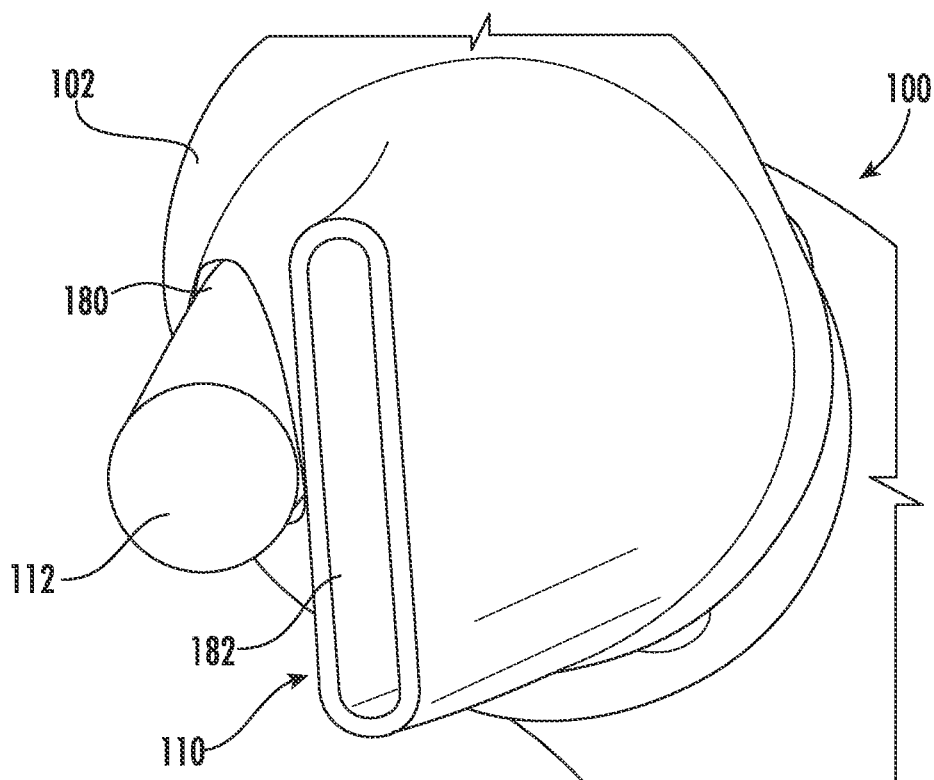
FIG. 9 is an enlarged view of a distal end of an insertion tool in accordance with an exemplary embodiment of the present disclosure.

FIG. 9 illustrates an embodiment of the distal end 110 of the tool 100. The final segment 102 of the tool 100 disposed at the distal end 110 can include an opening 180 (which may be similar to or the same as the cavity 136 and/or 148) in which the camera 112 can extend through. In such a manner, the camera 112 can monitor a leading edge of the tool 100 as it enters the engine and as it performs servicing operations including inspection of the engine and/or repair operations. As previously described, the camera 112 can be disposed within a circumferential boundary of the tool 100. That is, in accordance with an embodiment, the camera 112 can be disposed within an outer diameter of the segments 102 such that the camera does not create a larger leading edge diameter as compared to the diameter of the segments 102. The aforementioned holes 142 and 156 can be in communication with a final hole 182 through which an implement, such as a flat cable, can be passed through. As described above, the implement can be hand, or machine, fed through the orifice 178 (FIG. 8) to the distal end 110 for performing the servicing operation.

Figure 10:
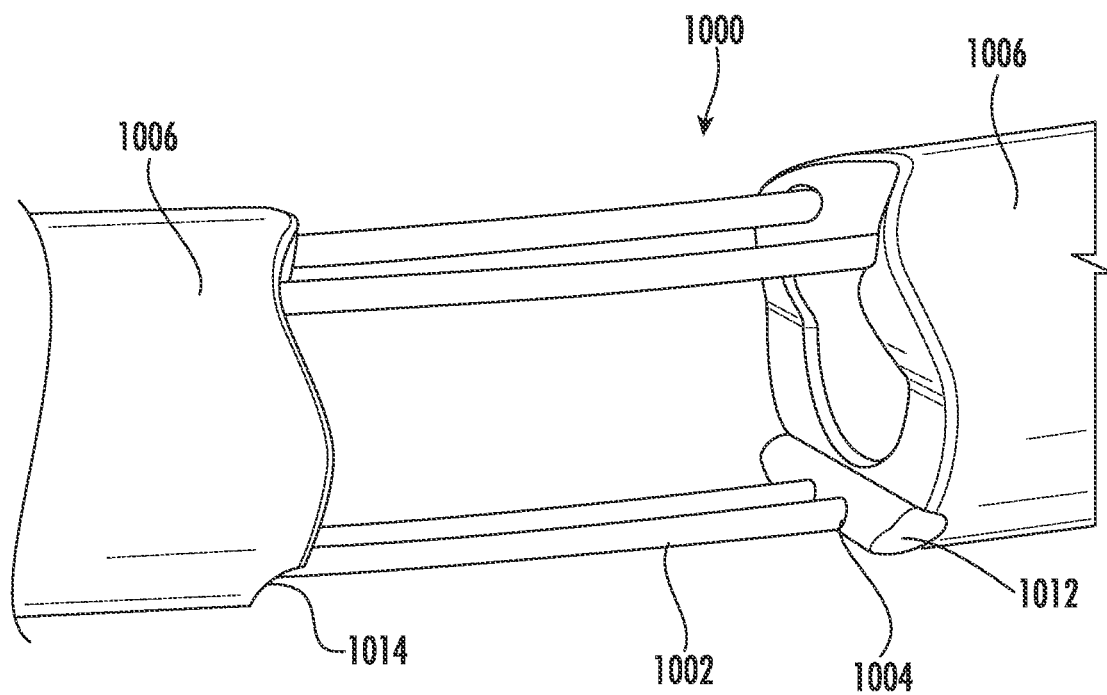
FIG. 10 is a perspective view of an interface between adjacent segments of an insertion tool in accordance with an exemplary embodiment of the present disclosure as seen in a non-rigidized configuration.
Figure 11:
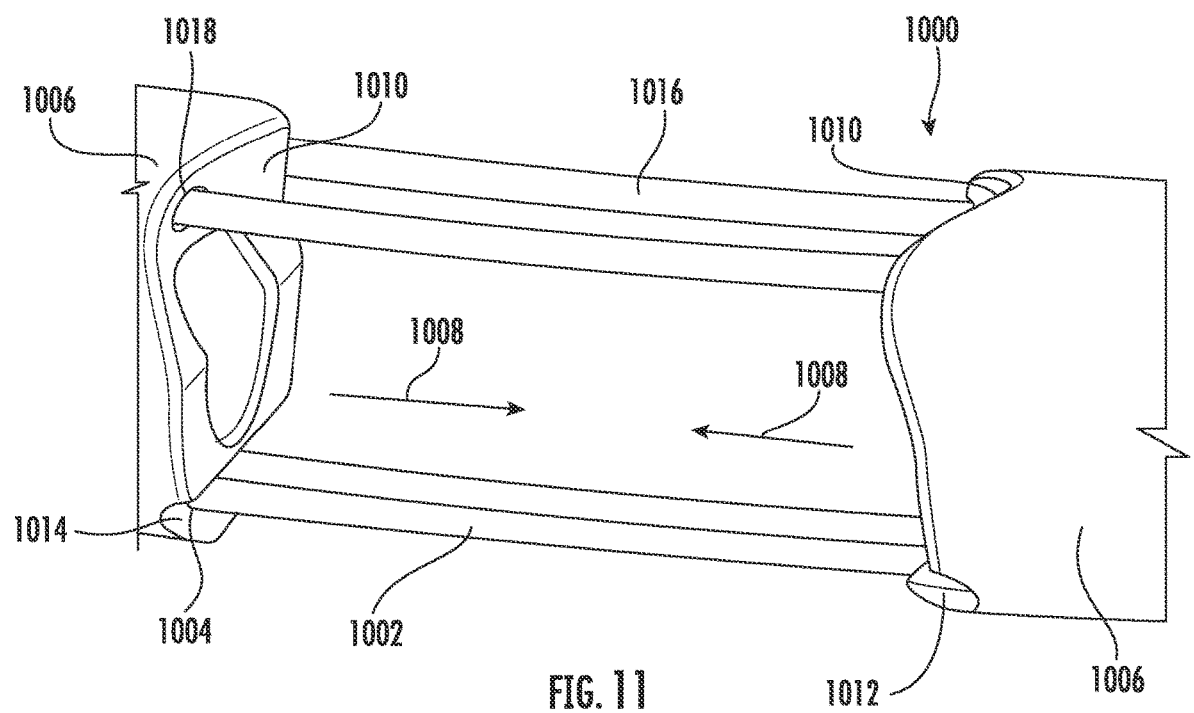
FIG. 11 is a perspective view of an interface between adjacent segments of an insertion tool in accordance with an exemplary embodiment of the present disclosure as seen in a non-rigidized configuration.
Figure 12:
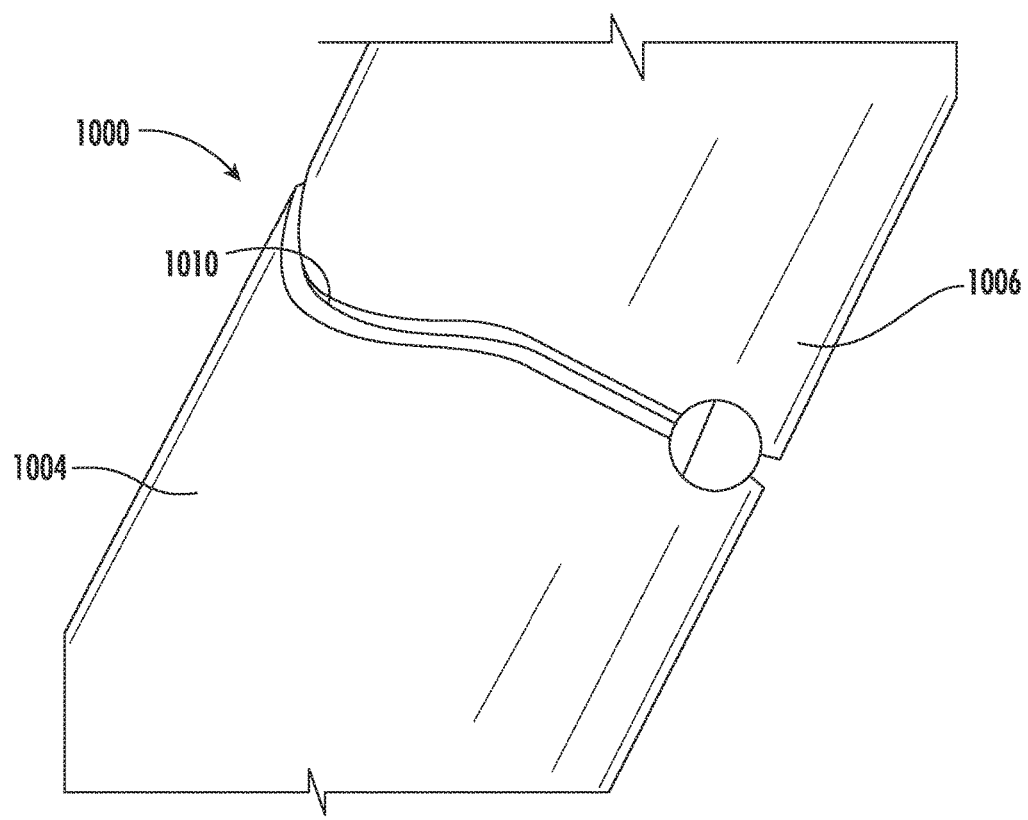
FIG. 12 is a perspective view of an interface between adjacent segments of an insertion tool in accordance with an exemplary embodiment of the present disclosure as seen in a rigidized configuration.

FIGS. 10 and 11 illustrate an embodiment of an insertion tool 1000 with a strength member 1002 extending through cavities 1004 of adjacent segments 1006. The strength member 1002 illustrated in FIGS. 10 and 11 includes a plurality of strength members, such as at least two strength members, such as at least three strength members. However, the strength member 1002 may alternatively include a single strength member. The insertion tool 1000 is illustrated in the non-rigidized configuration wherein the segments 1006 are not coupled together at a fixed angular disposition. That is, the adjacent segments 1006 can readily move relative to each other. FIG. 12 illustrates the insertion tool 1000 with segments 1006 fixedly coupled together by the strength member 1002. Selectively rigidizing the tool 1000, i.e., transitioning from the non-rigidized configuration illustrated in FIGS. 10 and 11, to the rigidized configuration illustrated in FIG. 12, can occur, for example, by tensioning the strength member 1002 and/or one or more support members 1016 disposed opposite the cavities 1004. As tension is applied, the length of the strength member 1002 and/or support members 1016 within the tool 1000 can decrease, effectively pulling adjacent segments 1006 together in the direction shown by arrows 1008 (FIG. 11). As the segments 1006 come into contact with one another, internal tension within the strength member 1002 and/or support members 1016 increases, thereby maintaining the segments 1006 connected together, and effectively rigidizing the tool 1000. Ends 1010 of the segments 1006 can be keyed together to prevent relative movement in the rigidized configuration. Keyed ends 1010 can include complementary face characteristics that, when combined, prevent relative movement, e.g., rotation, between the adjacent segments 1006. By way of non-limiting example, the keyed ends 1010 can include complementary posts and recesses, complementary undulating features, complementary castellations, and the like. As the complementary features are mated with one another, the adjacent segments 1006 can become fixed relative to one another and maintained at their fixed relative position by tension within the strength member 1002.

In the illustrated embodiment, the adjacent pair of depicted segments 1006 include complementary ridges 1012 and channels 1014 configured to align with one another in the rigidized configuration. In addition to securing the segments 1006 at relatively fixed positions with respect to one another, the ridges 1012 and channels 1014 can act as hinges for the segments 1006 when the strength member 1002 is less than fully tensioned. That is, for instance, when tension on the strength member 1002 is lessened, the segments 1006 may deflect relative to one another. If tension is maintained above a certain amount, such that the ridges 1012 and channels 1014 do not fully unseat from one another, the segments 1006 may move within a guided track relative to each other about a pivot axis formed by the ridges 1012 and channels 1014. This may be advantageous during insertion of the tool 1000 into the engine 10 as the tool 1000 may be forced to navigate complex geometry within the engine which requires the tool 1000 to bend while simultaneously retaining some amount of rigidity.

As previously described, selective rigidization of the tool 1000 can occur through use of one or more support members 1016. The one or more support members 1016 can extend through auxiliary cavities 1018 of the segments 1006. The support members 1016 can help retain the segments 1006 together, for instance, when the strength member 1002 is in the non-fully tensed state. The support members 1016 can further assist in guiding the tool 1000 within the engine 10 during the tool insertion process. The support members 1016 can also be used to selectively rigidize the tool 1000 while the strength member 1002 forms a flexible backbone for the tool 1000.

As described with respect to FIGS. 6 and 7, adjacent segments 102 of the tool may be joined together at interface 120 by one or more hinge members, e.g., a first hinge member 122 and a second hinge member 124. The first and second hinge members 122 and 124 can act together to connect the segments 102 while permitting relative movement therebetween, particularly when the tool 100 is not rigidized. The first and second hinge members 122 and 124 described with respect to FIGS. 6 and 7 are held together through interference fit. In particular, surfaces 134A and 134B engage with surfaces 144A and 144B, respectively, to dynamically hold adjacent segments 102 together. FIGS. 13 to 18 depict alternate embodiments of the interface 120 and associated hinges 122 and 124.

FIG. 13A illustrates an enlarged view of an interface 120 formed between adjacent segments 102 in accordance with an exemplary embodiment. FIG. 13B illustrates an enlarged, cross-sectional view of the interface as seen along Line A-A in FIG. 13A. Referring initially to FIG. 13A, the segments 102 can define first and second hinge members 122 and 124 as described above. The first and second hinge members 122 and 124 can cooperatively mate with one another to permit selectively flexure between the segments 102.

In one or more embodiments, the first and second hinge members 122 and 124 can be integrally formed with the body 114 of the segment 102. In a particular embodiment, the segments 102, including the first and second hinge members 122 and 124, can be formed using an additive manufacturing process, such as for example, three-dimensional printing, resulting in a stratum including a plurality of layers. In yet a more particular embodiment, the segments 102 can be formed in the assembled state such that adjacent segments 102 are, e.g., additively manufactured with the resulting interfaces 120 formed during the manufacturing process and ready for use. While additively manufacturing the interfaces 120 with the first and second hinge members 122 and 124 assembled may reduce the introduction of weakness into the bodies 114 resulting from flexing the bodies to install the first and second hinge members 122 and 124 relative to one another, certain additive manufacturing processes can also result in the formation of excess material left at the interface 120. For instance, certain three-dimensional printing processes utilize printing powder which is formed into the final shape of the structure being printed. Not all of the printing powder may solidify, resulting in powder being caught within the interface 120. Such stray powder can reduce efficiency of the tool 100, potentially resulting in premature wear and/or failure while the tool 100 is disposed within the engine 10 or even result in powder being deposited in the engine as the tool 100 navigates therethrough during insertion therein.

To mitigate the confluence of powder within the interface 120, the first and second hinge members 122 and 124 can be shaped so as to have a powder gap 184 configured to permit powder to pass therethrough. In particular, the powder gap 184 may permit passage of powder through the powder gap 184 when the tool 100 is flexed or otherwise deformed. Referring to FIG. 13B, the powder gap 184 may be formed by a gap between the first and second hinge members 122 and 124. Powder 186 can exit the interface 120 through the powder gap 184 in a direction corresponding, for example, with arrow 188. To further enhance powder removal from the interface 120, in certain instances at least one of the first and second hinge members 122 and 124 can have a tapered interface profile. For instance, an inner sidewall 190 of the second hinge member 124 can have an outward tapered profile. The inner sidewall 190 can define a taper angle, $\beta$, as measured with respect to a normal axis 194, of at least one degree, such as at least two degrees, such as at least three degrees, such as at least four degrees, such as at least five degrees, such as at least six degrees, such as at least seven degrees, such as at least eight degrees, such as at least nine degrees, such as at least ten degrees, such as at least fifteen degrees. In another embodiment, the outer sidewall 192 of the first hinge member 122 can have an inward tapered profile. The outer sidewall 194 can define a taper angle, $\alpha$, as measured with respect to the normal axis 194, of at least one degree, such as at least two degrees, such as at least three degrees, such as at least four degrees, such as at least five degrees, such as at least six degrees, such as at least seven degrees, such as at least eight degrees, such as at least nine degrees, such as at least ten degrees, such as at least fifteen degrees. In certain instances, $\alpha$ can be equal, or approximately equal, with $\beta$. In other instances, $\alpha$ and $\beta$ can be different from one another. In an embodiment, the inner sidewall 190 and the outer sidewall 192 can be angularly offset from one another.

FIG. 14A illustrates an enlarged view of an interface 120 formed between adjacent segments 102 in accordance with another exemplary embodiment when the tool 100 is in a rigid, or semi-rigid, configuration. FIG. 14B illustrates an enlarged view of the interface 120 of FIG. 14A when the tool is in a non-rigid configuration, i.e., the segments 102 are not rigidly held together and have moved relative to one another. The interface 120 depicted in FIGS. 14A and 14B is multi-modal. Multi-modal interfacing can include instance of close-fit and other instances of loose fit. In the rigid configuration, the first and second hinge members 122 and 124 have a close-fitting arrangement whereby accurate alignment between the segments 102 occurs. In the non-rigid configuration, the first and second hinge members 122 and 124 can have a loose fit whereby the interface 120 is relaxed. Close-fitting arrangement can be the result of hinge geometry. For instance, the first hinge member 122 can define an elongated length, $L_1$, and the second hinge member 124 can define an elongated length, $L_2$. In the rigid configuration, $L_1$ and $L_2$ can be offset from one another. For instance, $L_1$ and $L_2$ can be rotationally offset from one another by at least one degree, such as at least two degrees, such as at least three degrees, such as at least four degrees, such as at least five degrees, such as at least six degrees, such as at least seven degrees, such as at least eight degrees, such as at least nine degrees, such as at least ten degrees, such as at least fifteen degrees, such as at least twenty degrees, such as at least thirty degrees, such as at least forty degrees, such as at least fifty degrees, such as at least sixty degrees, such as at least seventy degrees, such as at least eighty degrees, such as at least ninety degrees. In the non-rigid configuration, $L_1$ and $L_2$ can be offset from one another by an amount less than in the rigid configuration. By way of non-limiting example, in a particular embodiment $L_1$ and $L_2$ can be offset from one another by ninety degrees in the rigid configuration and offset by less than ninety degrees in the non-rigid configuration.

In an embodiment, the first hinge member 122 comprises a post 210 and the second hinge member 124 comprises a recess 212 into which the post 210 is insertable. At least one of the post 210 and recess 212 can have an aspect ratio different than 1:1, wherein the aspect ratio is defined by a length of the post 210 and/or recess 212, e.g., $L_1$, relative to a width thereof, as measured perpendicular to the length. That is, for example, at least one of the first and second hinge members 122 and 124 can have an elongated shape.

Figure 15A:
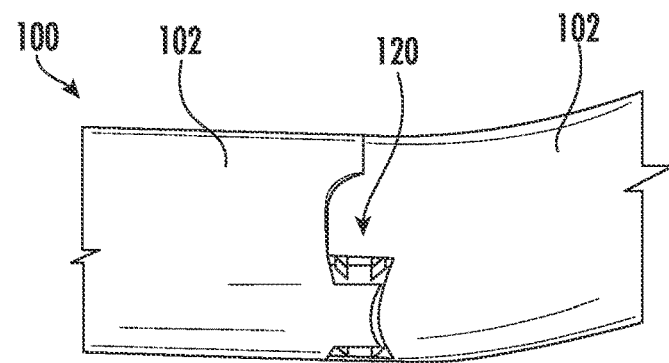
FIG. 15A is a side view of an interface between adjacent segments of an insertion tool in accordance with an exemplary embodiment of the present disclosure as seen in a rigidized configuration.
Figure 15B:
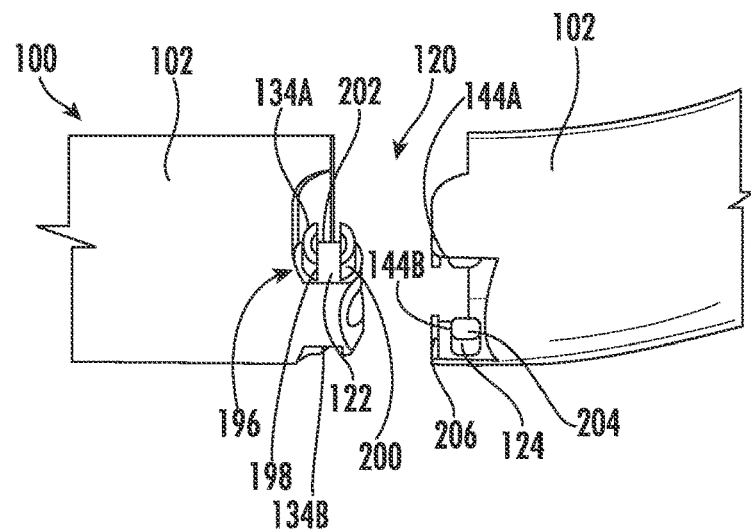
FIG. 15B is a side view of an interface between adjacent segments of an insertion tool in accordance with an exemplary embodiment of the present disclosure as seen in a disconnected configuration.

FIG. 15A illustrates an enlarged view of an interface 120 formed between adjacent segments 102 in accordance with another exemplary embodiment. FIG. 15B illustrates an enlarged view of the interface 120 between adjacent segments 102 as seen in a disconnected configuration for purpose of viewing the first and second hinge members 122 and 124. In an embodiment, the first and second hinge members 122 and 124 can be configured to be connected to one another when the adjacent pair of segments 102 are disposed at a first orientation with respect to one another. After adjusting the adjacent pair of segments 102 to a second orientation different from the first orientation, the adjacent pair of segments 102 can remain coupled together. This type of engagement may be described as displaced-to-lock engagement. By way of example, the displacement can include angular displacement. The angular displacement between the first and second orientations can be at least 1°, such as at least 2°, such as at least 3°, such as at least 4°, such as at least 5°, such as at least 10°, such as at least 20°, such as at least 30°, such as at least 40°, such as at least 50°, such as at least 60°, such as at least 70°, such as at least 80°. The displacement can also include translation, pivoting, the like, or any combination thereof.

In the embodiment illustrated in FIG. 15B, the first hinge member 122 includes receiving structure 196 comprising a first side surface 198 and a second side surface 200. The first and second side surfaces 198 and 200 can extend from at least one of opposite side surfaces 134A and 134B of the first hinge member 122. The first and second side surfaces 198 and 200 define a gap 202 that extends therebetween. The second hinge member 124 includes a projection 204 configured to be passed through the gap 202 when the segments are oriented relative to one another at the first orientation and retained between the first and second side surfaces 198 and 200 when the segments 102 are oriented relative to one another at the second orientation. A retaining element 206 can additionally be passed through the gap 202 when the first and second hinge members 122 and 124 are joined together in the first orientation. In the connected (i.e., engaged) configuration resulting from reorienting the segments 102 to the second orientation, the retaining element 206 can interface with the first side surface 198 to further support and maintain engagement between the segments 102. In an embodiment, the receiving structure 196 can be approximately the same on opposite side surfaces 134A and 134B of the first hinge member 122. In another embodiment, the projection 204 and retaining element 206 can be approximately the same on both opposite side surfaces 144A and 144B of the second hinge member 124.

Figure 16A:
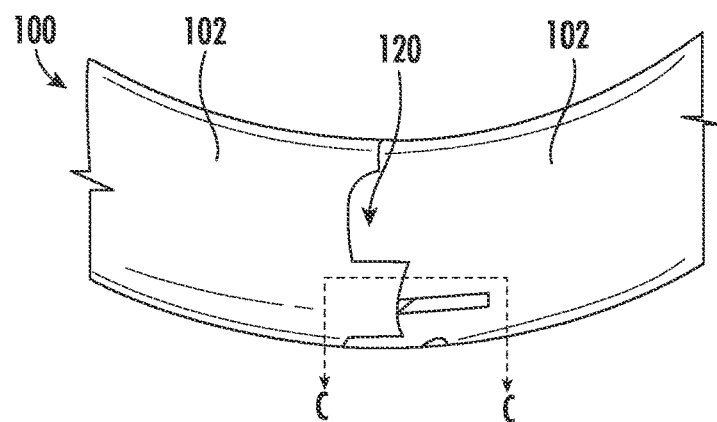
FIG. 16A is a side view of an interface between adjacent segments of an insertion tool in accordance with an exemplary embodiment of the present disclosure as seen in a rigidized configuration.
Figure 16B:
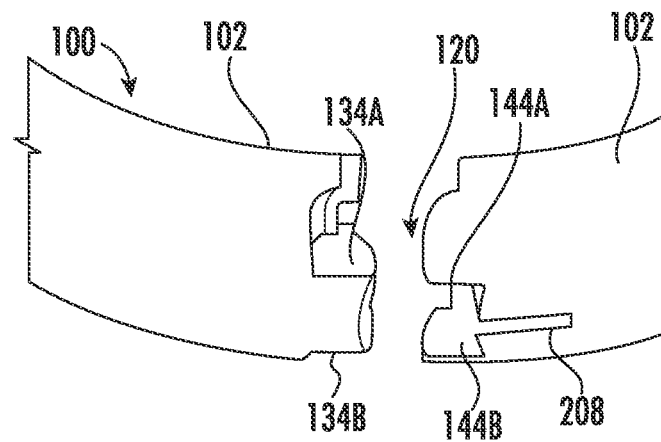
FIG. 16B is a side view of an interface between adjacent segments of an insertion tool in accordance with an exemplary embodiment of the present disclosure as seen in a disconnected configuration.
Figure 16C:
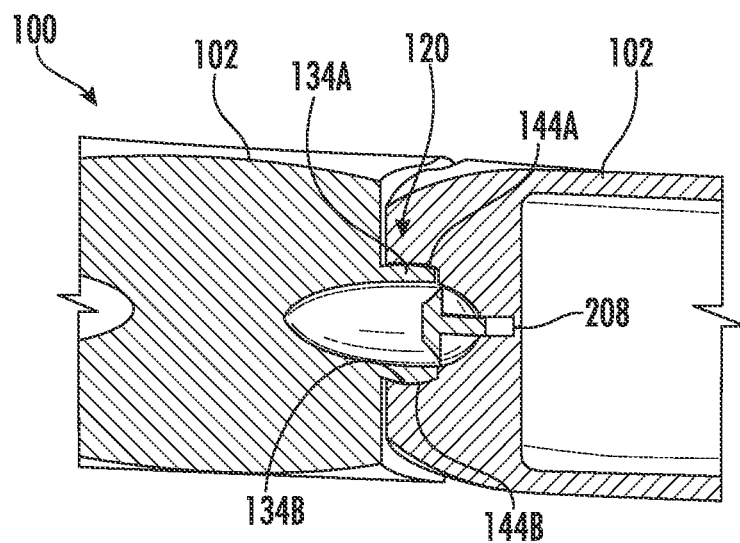
FIG. 16C is a cross-sectional view of the interface between adjacent segments as seen along Line C-C in FIG. 16A in accordance with an embodiment.

FIG. 16A illustrates an enlarged view of an interface 120 formed between adjacent segments 102 in accordance with another exemplary embodiment. FIG. 16B illustrates an enlarged view of the interface 120 between adjacent segments 102 as seen in a disconnected configuration for purpose of viewing the first and second hinge members. FIG. 16C illustrates a cross-sectional view of the interface 120 between adjacent segments 102 as seen along Line C-C in FIG. 16A. The interface 120 includes a compliance feature 208 disposed between opposite side surfaces 144A and 144B of the second hinge member 124. The compliance feature 208 can permit expansion between the opposite side surfaces 144A and 144B during assembly of the segments 102. In an embodiment the compliance feature 208 can include a slit extending into the body 114 of the segment. The slit can define a length of at least 0.1 mm, such as at least 0.2 mm, such as at least 0.3 mm, such as at least 0.4 mm, such as at least 0.5 mm, such as at least 1 mm, such as at least 2 mm, such as at least 3 mm, such as at least 4 mm, such as at least 5 mm. As the first and second hinge members 122 and 124 are brought together so as to be engaged with one another, a diameter of the slit can increase, allowing the opposite surfaces 134A and 134B to pass over and onto the opposite side surfaces 144A and 144B. In an embodiment, the opposite surfaces 134A and 134B of the first hinge member 122 can be complementary to opposite side surface 144A and 144B of the second hinge member 124. Complementary side surfaces can include, for example, flat surfaces, conical surface, hemispherical surfaces, and the like which fit together so as to maintain the first and second hinge members 122 and 124 coupled together at the interface 120.

In accordance with one or more embodiments described herein, the first and second hinge members 122 and 124 can be configured to float relative to one another. As used herein, "float relative to one another" refers to an interface whereby two or more members, such as the first and second hinge members 12 and 124 of adjacent segments 102, are not fixedly coupled together and can move relative to one another, e.g., in the relaxed state. Instead, the adjacent segments 102 are held together, for example, by the strength member and/or support member, i.e., in the selectively rigidized state. Conversely, in certain instances, when tension is removed, the adjacent segments 102 may separate from one another when the first and second hinge members 122 and 124 float relative to one another.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

Embodiment 1. An insertion tool for performing an operation on equipment, the insertion tool comprising: a plurality of segments, each segment of the plurality of segments including a body comprising: a first hinge member; and a second hinge member, the first hinge member of a first segment being coupled to the second hinge member of a second segment adjacent to the first segment through an interface, wherein the interface comprises a powder gap, a multi-modal interface, a compliance feature, a displace-to-lock configuration, an interference fit, or any combination thereof.

Embodiment 2. The insertion tool of any one or more of the embodiments, wherein the body of at least one of the segments comprises a stratum comprising a plurality of layers.

Embodiment 3. The insertion tool of any one or more of the embodiments, wherein the insertion tool comprises a strength member transversely intersecting the interface.

Embodiment 4. The insertion tool of any one or more of the embodiments, wherein the powder gap is disposed between an outer sidewall of the first hinge member and an inner sidewall of the second hinge member.

Embodiment 5. The insertion tool of any one or more of the embodiments, wherein the inner and outer sidewalls are angularly offset from one another.

Embodiment 6. The insertion tool of any one or more of the embodiments, wherein the multi-modal interface comprises a close fit when the adjacent segments are rigidized by the strength member and a loose fit when the adjacent segments are not rigidized by the strength member.

Embodiment 7. The insertion tool of any one or more of the embodiments, wherein the first hinge member comprises a post and the second hinge member comprises a recess into which the post is insertable, and wherein at least one of the post and recess have an aspect ratio different than 1:1.

Embodiment 8. The insertion tool of any one or more of the embodiments, wherein the first hinge member comprises a first outer surface and a second outer surface, wherein the second hinge member comprises a first inner surface and a second inner surface, and wherein the interface comprises a hemispherical interface between the first outer surface and the first inner surface and a hemispherical interface between the second outer surface and the second inner surface.

Embodiment 9. The insertion tool of any one or more of the embodiments, wherein the displace-to-lock interface comprises a projection of the second hinge member configured to pass through a gap between adjacent side surfaces of a receiving structure of the first hinge member.

Embodiment 10. An insertion tool for performing an operation on equipment, the insertion tool comprising: a plurality of segments, each segment of the plurality of segments including a body comprising: a first hinge member; and a second hinge member, the first hinge member of a first segment being coupled to the second hinge member of a second segment adjacent to the first segment through an interface, wherein the interface comprises a powder gap, a multi-modal interface, a compliance feature, a displace-to-lock configuration, an interference fit, or any combination thereof; and a strength member intersecting the interface.

Embodiment 11. The insertion tool of any one or more of the embodiments, wherein the strength member comprises a backbone of the insertion tool configured to maintain the plurality of segments coupled together when the insertion tool is not rigidized.

Embodiment 12. A method of forming an insertion tool, the method comprising: additively forming bodies of segments of the insertion tool; and flexing adjacent segments of the insertion tool relative to one another such that powder contained at an interface between adjacent segments of the insertion tool can pass from the interface through a powder gap.

Embodiment 13. The method of any one or more of the embodiments, wherein flexing adjacent segments of the insertion tool is performed by tensioning a strength member extending between the adjacent segments.

Embodiment 14. The method of any one or more of the embodiments, wherein the adjacent segments include a first segment having a first hinge member and a second segment having a second hinge member, and wherein the first and second hinge members define the interface between the first and second segments.

Embodiment 15. The method of any one or more of the embodiments, wherein the first and second hinge members are configured to move relative to one another when the tool is not rigidized.

Embodiment 16. The method of any one or more of the embodiments, wherein the interface further comprises a multi-modal interface, a compliance feature, a displace-to-lock configuration, an interference fit, or any combination thereof.

Embodiment 17. The method of any one or more of the embodiments, wherein additively forming the bodies comprises three-dimensional printing.

Embodiment 18. The method of any one or more of the embodiments, further comprising rigidizing the insertion tool by applying force to the strength member.

Embodiment 19. The method of any one or more of the embodiments, wherein the adjacent segments are configured to rotate by an engagement displacement between rigidized and non-rigidized configurations, and wherein flexing adjacent segments of the insertion tool relative to one another such that powder contained at the interface between adjacent segments of the insertion tool can pass from the interface through the powder gap is performed by rotating the adjacent segments by a rotational displacement no greater than the engagement displacement.

Embodiment 20. The method of any one or more of the embodiments, further comprising coupling the adjacent segments together after additively manufacturing the bodies of the segments.

What is claimed is:

1. An insertion tool for performing an operation on equipment, the insertion tool comprising: a plurality of segments including adjacent first and second segments connected to one another via an interface; wherein the interface comprises a first hinge member of the first segment and a second hinge member of the second segment; wherein the first hinge member is coupled to the second hinge member; wherein the first hinge member comprises a post and the second hinge member comprises a recess in which the post is received; wherein the post and recess allow the first and second segments to pivot relative to one another; wherein the first and second segments are shiftable between a non-rigid configuration, wherein the post is positioned in the recess with a loose fit, and a rigid configuration, wherein the post is positioned in the recess with a close-fit; wherein the post and recess are configured to be shifted between the loose fit and close-fit by rotating at least one of the first and second segments with respect to one another about an axis of rotation extending through the post and the recess while the post is retained in the recess; and wherein the post and the recess each have an elongate configuration such that the post and the recess each have an aspect ratio different than 1:1 such that when at least one of the first and second segments is rotated with respect to one another about the axis of rotation extending through post and the recess, the post and recess are shifted from the loose fit to the close-fit, wherein the post contacts the recess at opposing outer surface portions of the post, wherein said aspect ratio is defined as a length and width of a cross section of an end face of the post and a cross section of the recess; wherein the first and second hinge members define the axis of rotation about which the first and second segments are rotatable, the axis of rotation being transverse to a longitudinal axis of each of the first and second segments; wherein the post extends from a surface of the first segment in a direction parallel to the axis of rotation.

2. The insertion tool of claim 1, wherein a body of at least one of the plurality of segments comprises a stratum comprising a plurality of sequentially-formed layers.

3. The insertion tool of claim 1, wherein the first segment comprises a third hinge member and the second segment comprises a fourth hinge member, wherein the third hinge member is positioned in the fourth hinge member to allow the first and second segments to pivot relative to one another in cooperation with the first and second hinge members.

4. The insertion tool of claim 1, wherein the post and recess are configured to allow the first and second segments to rotate only about the axis of rotation when the first and second segments are shifted from the non-rigid configuration to the rigid configuration such that the first and second segments have a predefined orientation in the rigid configuration.

5. The insertion tool of claim 1, wherein the post and the recess are each laterally offset in a radial direction from the longitudinal axis of the respective first and second segments such that a gap is formed between ends of the first and second segments that increases in size when the first and second segments are pivoted away from one another about the axis of rotation.

6. The insertion tool of claim 1, wherein the insertion tool comprises an elongate strength member extending between the first and second segments and transversely intersecting the interface, wherein the strength member is configured to shift the first and second segments between the non-rigid configuration to the rigid configuration.

7. The insertion tool of claim 6, wherein the interface comprises the close-fit when the first and second segments are rigidized by the strength member and the loose fit when the first and second segments are not rigidized by the strength member.

8. The insertion tool of claim 1, wherein the interface comprises a powder gap disposed between an outer surface of the post and an inner facing surface of the recess.

9. The insertion tool of claim 8, wherein the inner facing surface of the recess and the outer surface of the post are angularly offset from one another.

10. An insertion tool for performing an operation on equipment, the insertion tool comprising: a plurality of segments including a first segment and an adjacent second segment connected to one another via an interface; wherein the interface comprises a first hinge member of the first segment and a second hinge member of the second segment; wherein the first hinge member is coupled to the second hinge member; wherein the first hinge member comprises a post and the second hinge member comprises a recess in which the post is received, wherein the recess comprises an endless inner facing surface that surrounds the post; wherein the post and recess allow the first and second segments to pivot relative to one another; wherein the first and second segments are shiftable between a non-rigid configuration, wherein the post is positioned in the recess with a loose fit, and a rigid configuration, wherein the post is positioned in the recess with a close-fit; a strength member extending between the first and second segments and intersecting the interface, wherein the strength member is configured to shift the first and second segments between the non-rigid configuration and the rigid configuration; wherein the post and recess are configured to be shifted between the loose fit and close-fit by rotating at least one of the first and second segments with respect to one another about an axis of rotation extending through the post and the recess while the post is retained in the recess; and wherein the post and the recess each have an aspect ratio different than 1:1 such that when at least one of the first and second segments is rotated with respect to one another about the axis of rotation extending through the post and the recess, the post and recess are shifted from the loose fit to the close-fit, wherein said aspect ratio is defined as a length and width of a cross section of the post and the recess; wherein the first and second hinge members define the axis of rotation about which the first and second segments are rotatable, the axis of rotation being transverse to a longitudinal axis of each of the first and second segments; wherein the post extends from a surface of the first segment in a direction parallel to the axis of rotation.

11. The insertion tool of claim 10, wherein the strength member comprises a backbone of the insertion tool configured to maintain the plurality of segments coupled together when the insertion tool is not rigidized.

12. The insertion tool of claim 10, wherein a body of at least one of the plurality of segments comprises a stratum comprising a plurality of sequentially-formed layers.

13. The insertion tool of claim 10, wherein the first and second hinge members are configured to move relative to one another when the tool is not rigidized.

14. The insertion tool of claim 10, wherein at least one of the post and recess include a tapered interface profile.

15. The insertion tool of claim 10, wherein the interface comprises a powder gap disposed between an outer surface of the post and the endless inner facing surface of the recess.

16. The insertion tool of claim 15, wherein the endless inner facing surface of the recess and the outer surface of the post are angularly offset from one another.

\* \* \* \* \*